US012562653B2

(12) United States Patent
Nakamura et al.

(10) Patent No.:  US 12,562,653 B2
(45) Date of Patent:      Feb. 24, 2026

(54) POWER CONVERSION DEVICE

(71) Applicant: Mitsubishi Electric Corporation, Tokyo (JP)

(72) Inventors: Fuminori Nakamura, Tokyo (JP); Yoshiyuki Kono, Tokyo (JP); Ryosuke Uda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 233 days.

(21) Appl. No.: 18/246,252

(22) PCT Filed: Sep. 29, 2020

(86) PCT No.: PCT/JP2020/036961
§ 371 (c)(1),
(2) Date: Mar. 22, 2023

(87) PCT Pub. No.: WO2022/070269
PCT Pub. Date: Apr. 7, 2022

(65) Prior Publication Data
US 2023/0361690 A1      Nov. 9, 2023

(51) Int. Cl.
H02M 7/483      (2007.01)
H02M 1/12       (2006.01)
H02M 1/00       (2006.01)

(52) U.S. Cl.
CPC ........... H02M 7/4835 (2021.05); H02M 1/12 (2013.01); H02M 1/0054 (2021.05)

(58) Field of Classification Search
None
See application file for complete search history.

(56) References Cited

U.S. PATENT DOCUMENTS

2009/0213627 A1 *   8/2009   Chen ..................... H02M 7/219
                                                    363/74

FOREIGN PATENT DOCUMENTS

EP              3361619 A1 *   8/2018   ............ H02M 7/043
JP         2006223023 A        8/2006
JP         2009291019 A  *  12/2009
JP         2016174490 A  *   9/2016
JP         2018133950 A        8/2018
JP            6622442 B1     12/2019
WO    WO-2015000521 A1 *   1/2015   ............... G06F 1/26
                    (Continued)

OTHER PUBLICATIONS

WO2020079817 Translation (Year: 2020).*
                    (Continued)

*Primary Examiner* — Thienvu V Tran
*Assistant Examiner* — Jennifer C Caulk
(74) *Attorney, Agent, or Firm* — Buchanan Ingersoll & Rooney PC

(57)                ABSTRACT

A power conversion device includes a self-commutated power converter that performs power conversion between an AC circuit and a DC circuit, and a control device that controls switching operation of a switching element included in the self-commutated power converter. The control device performs first control to increase a switching frequency of the switching element when a control command value for the self-commutated power converter becomes equal to or greater than a first threshold value.

10 Claims, 15 Drawing Sheets

(56)  References Cited

FOREIGN PATENT DOCUMENTS

WO      WO-2020079817  A1  *   4/2020   .............. H02M 7/49

OTHER PUBLICATIONS

Extended European Search Report dated Oct. 17, 2023, issued in the corresponding European Patent Application No. 20956199.2, 8 pages.
International Search Report (PCT/ISA/210) with translation and Written Opinion (PCT/ISA/237) mailed on Dec. 1, 2020, by the Japan Patent Office as the International Searching Authority for International Application No. PCT/JP2020/036961.
Japanese Office Action with translation mailed May 11, 2021, by the Japan Patent Office for Application No. JP 2021-510235. (10 pages).
Communication pursuant to Article 94(3) EPC dated Oct. 10, 2025, issued in the corresponding European Patent Application No. 20956199. 2, 9 pages.

* cited by examiner

CONTROL COMMAND VALUE → COMMAND VALUE INPUT UNIT (131) → DETERMINATION UNIT (132) → FREQUENCY SWITCHING SIGNAL

THRESHOLD VALUE Th1

(b)

THRESHOLD
VALUE Th1

THRESHOLD
VALUE Th2

(a)

(b)

(c)

REFERENCE VALUE St

CONDITION INFORMATION

POWER CONVERSION DEVICE

TECHNICAL FIELD

The present disclosure relates to a power conversion device.

BACKGROUND ART

Modular multilevel converters (MMC) are known as large-capacity power conversion devices installed in power systems. A modular multilevel converter in which a plurality of unit converters are cascaded can be easily adapted to higher voltages by increasing the number of unit converters. "Unit converters" are also referred to as "sub modules" or "converter cells".

Japanese Patent Laying-Open No. 2018-133950 (PTL 1) discloses a power conversion device capable of converting power bidirectionally between DC voltage and AC voltage. The power conversion device is configured to output a first carrier signal having a first frequency when the absolute value of the AC voltage is equal to or greater than the absolute value of a threshold voltage and to output a second carrier signal having a second frequency higher than the first frequency when the absolute value of the AC voltage is lower than the absolute value of the first threshold voltage.

CITATION LIST

Patent Literature

PTL 1: Japanese Patent Laying-Open No. 2018-133950

SUMMARY OF INVENTION

Technical Problem

In PTL 1, as described above, the frequency of the carrier signal is changed in accordance with the absolute value of the AC voltage so that the frequency of switching operation is changed to continue the operation of the power conversion device even when a ground fault occurs on the AC side. However, PTL 1 does not sufficiently consider change of the switching frequency in cases other than a ground fault on the AC side and has room for improvement in stabilization of the operation of the power conversion device.

An object of an aspect of the present disclosure is to provide a power conversion device capable of stabilizing the operation by increasing the switching frequency at an appropriate timing. Other objects and features of the present disclosure will be explained in the embodiments.

Solution to Problem

A power conversion device according to an embodiment includes a self-commutated power converter to perform power conversion between an AC circuit and a DC circuit, and a control device to control switching operation of a switching element included in the self-commutated power converter. The control device performs first control to increase a switching frequency of the switching element when a control command value for the self-commutated power converter becomes equal to or greater than a first threshold value.

A power conversion device according to another embodiment includes a self-commutated power converter to perform power conversion between an AC circuit and a DC circuit, and a control device to control switching operation of a switching element included in the self-commutated power converter. The control device performs control to increase a switching frequency of the switching element when a magnitude of a parameter concerning voltage or current that is calculated based on a quantity of electricity of the AC circuit becomes equal to or greater than a reference value.

A power conversion device according to yet another embodiment includes a self-commutated power converter to perform power conversion between an AC circuit and a DC circuit, and a control device to control switching operation of a switching element included in the self-commutated power converter. The self-commutated power converter includes a plurality of leg circuits. The leg circuits each include a plurality of converter cells cascaded to each other. The converter cells each include a capacitor and a switching element. The control device performs control to increase a switching frequency of the switching element when circulating current circulating between the leg circuits is equal to or greater than a reference value, when a variation range of a voltage mean value of the capacitors is equal to or greater than a reference variation range, or when at least one of voltages of the capacitors falls out of a threshold range.

A power conversion device according to yet another embodiment includes a self-commutated power converter to perform power conversion between an AC circuit and a DC circuit, and a control device to control switching operation of a switching element included in the self-commutated power converter. The control device receives at least one of state information indicating a system state of the AC circuit and instruction information for specifying an operation mode of the self-commutated power converter. The control device performs control to increase a switching frequency of the switching element when at least one of a first condition that the system state based on the state information is a prescribed state and a second condition that the operation mode according to the instruction information is a prescribed mode is satisfied.

Advantageous Effects of Invention

The power conversion device according to the present disclosure can stabilize the operation by increasing the switching frequency at an appropriate timing.

BRIEF DESCRIPTION OF DRAWINGS

FIG. 3 is a circuit diagram showing a modification to a main circuit of the converter cell.

DESCRIPTION OF EMBODIMENTS

Embodiments of the present description will be described below with reference to the drawings. In the following description, the same parts are denoted by the same reference signs. Their names and functions are also the same. A detailed description thereof will not be repeated.

First Embodiment

<Overall Configuration of Power Conversion Device>

Figure 1:
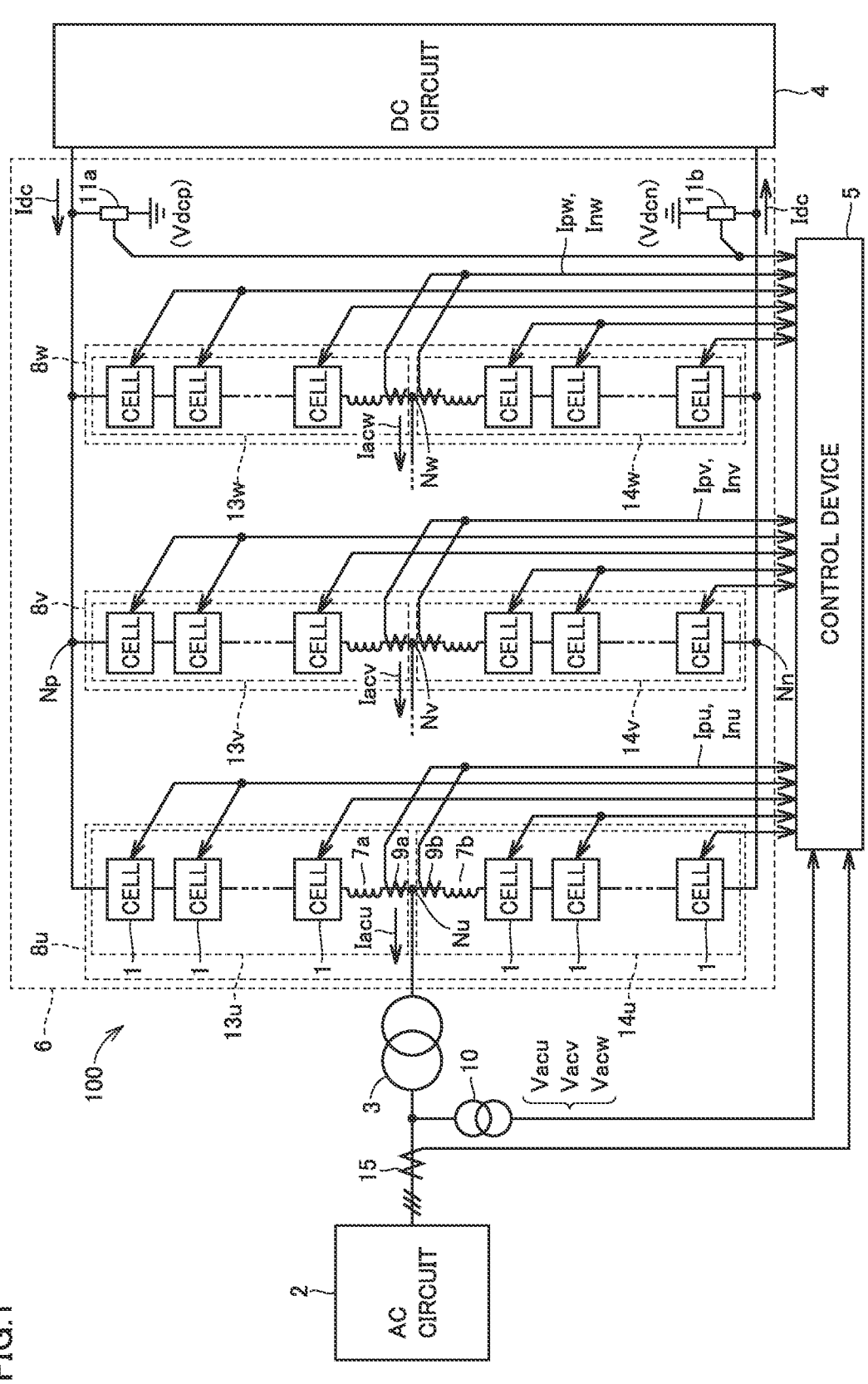
FIG. 1 is a schematic configuration diagram of a power conversion device.

FIG. 1 is a schematic configuration diagram of a power conversion device 100. Power conversion device 100 is, for example, a power conversion device for use for high-voltage DC power transmission or a power conversion device for forward conversion or reverse conversion in a frequency converter.

Referring to FIG. 1, power conversion device 100 includes a self-commutated power converter 6 that performs power conversion between an AC circuit 2 and a DC circuit 4, and a control device 5. Typically, power converter 6 is configured with a MMC conversion-type power converter including a plurality of converter cells 1 connected in series to each other. However, power converter 6 may be of a conversion type other than the MMC conversion type. Power converter 6 includes a plurality of leg circuits 8*u*, 8*v*, and 8*w* (hereinafter referred to as "leg circuit 8" when they are collectively referred to or any one of them is referred to) connected in parallel to each other between a positive-side DC terminal (that is, a high potential-side DC terminal) Np and a negative-side DC terminal (that is, a low potential-side DC terminal) Nn.

Control device 5 controls the switching operation of switching elements included in these leg circuits 8. As will be detailed later, control device 5 changes the switching frequency of the switching elements as appropriate in accordance with various conditions, in view of operation stabilization and power conversion efficiency of power converter 6.

Leg circuit 8 is provided for each phase of multi-phase alternating current and connected between AC circuit 2 and DC circuit 4 to perform power conversion between those circuits. In FIG. 1, AC circuit 2 is for three-phase alternating current, and three leg circuits 8*u*, 8*v*, and 8*w* are provided respectively corresponding to u phase, v phase, and w phase. When AC circuit 2 is for single-phase alternating current, two leg circuits are provided.

AC terminals Nu, Nv, and Nw respectively provided for leg circuits 8*u*, 8*v*, and 8*w* are connected to AC circuit 2 through a transformer 3. AC circuit 2 is, for example, an AC power system including an AC power source. In FIG. 1, for simplification of illustration, the connection between AC terminals Nv and Nw and transformer 3 is not shown. The DC terminals (that is, positive-side DC terminal Np, negative-side DC terminal Nn) provided common to leg circuits 8 are connected to DC circuit 4. DC circuit 4 is, for example, a DC power system including a DC power transmission grid and another power conversion device that outputs direct current.

Instead of using transformer 3 in FIG. 1, leg circuits 8*u*, 8*v*, and 8*w* may be connected to AC circuit 2 through an interconnecting reactor. Furthermore, instead of AC terminals Nu, Nv, and Nw, leg circuits 8*u*, 8*v*, and 8*w* may be provided with respective primary windings, and leg circuits 8*u*, 8*v*, and 8*w* may be AC connected to transformer 3 or the interconnecting reactor through secondary windings magnetically coupled to the primary windings. In this case, the primary windings may be the following reactors 7*a* and 7*b*. Specifically, leg circuits 8 are electrically (that is, DC or AC) connected to AC circuit 2 through connections provided for leg circuits 8*u*, 8*v*, and 8*w*, such as AC terminals Nu, Nv, and Nw or the primary windings.

Leg circuit 8*u* is divided into a positive-side arm 13*u* from positive-side DC terminal Np to AC terminal Nu and a negative-side arm 14*u* from negative-side DC terminal Nn to AC terminal Nu. The connection point between positive-side arm 13*u* and negative-side arm 14*u* is AC terminal Nu connected to transformer 3. Positive-side DC terminal Np and negative-side DC terminal Nn are connected to DC circuit 4. Leg circuit 8*v* includes a positive-side arm 13*v* and a negative-side arm 14*v*, and leg circuit 8*w* includes a positive-side arm 13*w* and a negative-side arm 14*w*. Leg circuits 8*v* and 8*w* have a configuration similar to that of leg circuit 8*u*, and hereinafter leg circuit 8*u* is explained as a representative.

In leg circuit 8*u*, positive-side arm 13*u* includes a plurality of cascaded converter cells 1 and a reactor 7*a*. Converter cells 1 and reactor 7*a* are connected in series with each other. Negative-side arm 14*u* includes a plurality of cascaded converter cells 1 and a reactor 7*b*. Converter cells 1 and reactor 7*b* are connected in series with each other.

Reactor 7*a* may be inserted at any position in positive-side arm 13*u*, and reactor 7*b* may be inserted at any position in negative-side arm 14*u*. A plurality of reactors 7*a* and a plurality of reactors 7*b* may be provided. The inductances of the reactors may be different from each other. Only reactor 7*a* of positive-side arm 13*u* or only reactor 7*b* of negative-side arm 14*u* may be provided.

Power conversion device 100 further includes an AC voltage detector 10, an AC current detector 15, DC voltage detectors 11*a* and 11*b*, and arm current detectors 9*a* and 9*b* provided for each leg circuit 8. These detectors measure the quantity of electricity (that is, current, voltage) for use in control of power conversion device 100. Signals detected by these detectors are input to control device 5.

Specifically, AC voltage detector 10 detects a u-phase AC voltage measured value Vacu, a v-phase AC voltage measured value Vacv, and a w-phase AC voltage measured value Vacw of AC circuit 2. AC current detector 15 is provided for each of u phase, v phase, and w phase of AC circuit 2 and detects an AC current measured value of the corresponding phase. DC voltage detector 11*a* detects a DC voltage measured value Vdcp at positive-side DC terminal Np connected to DC circuit 4. DC voltage detector 11*b* detects a DC voltage measured value Vdcn at negative-side DC terminal Nn connected to DC circuit 4.

Arm current detectors 9*a* and 9*b* provided in leg circuit 8*u* for u phase respectively detect a positive-side arm current measured value Iup flowing through positive-side arm $13u$ and negative-side arm current measured value Iun flowing through negative-side arm $14u$. Arm current detectors $9a$ and $9b$ provided in leg circuit $8v$ for v phase respectively detect positive-side arm current measured value Ivp and negative-side arm current measured value Ivn. Arm current detectors $9a$ and $9b$ provided for leg circuit $8w$ for w phase respectively detect positive-side arm current measured value Iwp and negative-side arm current measured value Iwn. Here, in positive-side arm current measured values Iup, Ivp, and Iwp and negative-side arm current measured values Iun, Ivn, and Iwn, current flowing in the direction from positive-side DC terminal Np to negative-side DC terminal Nn is positive.

<Configuration of Converter Cell>

Figure 2:
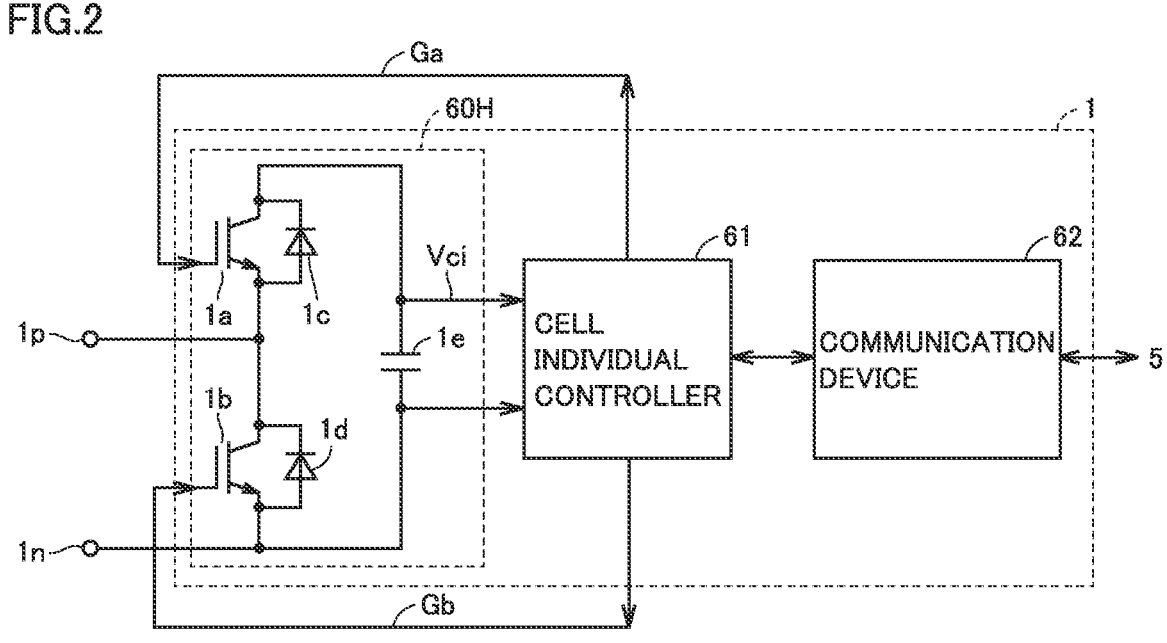
FIG. 2 is a block diagram showing a configuration example of a converter cell.

FIG. 2 is a block diagram showing a configuration example of converter cell 1. Referring to FIG. 2, converter cell 1 as an example includes a cell main circuit 60H, a cell individual controller 61, and a communication device 62. In FIG. 2, the configuration of half bridge-type cell main circuit 60H is shown. As described later with reference to FIG. 3, a bridge circuit of a different configuration may be used instead of cell main circuit 60H.

As shown in FIG. 2, cell main circuit 60H includes switching elements $1a$ and $1b$ connected in series to each other, diodes $1c$ and $1d$, and a capacitor $1e$ serving as an energy storage. Diodes $1c$ and $1d$ are connected in anti-parallel (that is, in parallel and in reverse bias direction) with switching elements $1a$ and $1b$, respectively. Capacitor $1e$ is connected in parallel with the series connection circuit of switching elements $1a$ and $1b$ and smooths a DC voltage. The connection node of switching elements $1a$ and $1b$ is connected to positive-side input/output terminal $1p$, and the connection node of switching element $1b$ and capacitor $1e$ is connected to negative-side input/output terminal $1n$.

In cell main circuit 60H, switching elements $1a$ and $1b$ are controlled such that one of them is turned on and the other is turned off. When switching element $1a$ is turned on and switching element $1b$ is turned off, the voltage between both ends of capacitor $1e$ is applied between input/output terminals $1p$ and $1n$. In this case, input/output terminal $1p$ has a positive-side voltage, and input/output terminal $1n$ has a negative-side voltage. On the other hand, when switching element $1a$ is turned off and switching element $1b$ is turned on, the voltage between input/output terminals $1p$ and $1n$ is 0 V. In this way, in cell main circuit 60H, switching elements $1a$ and $1b$ are alternately turned on, whereby zero voltage or positive voltage can be output. The magnitude of positive voltage is dependent on the voltage at capacitor $1e$. Diodes $1c$ and $1d$ are provided for protection for when a reverse-direction voltage is applied to switching elements $1a$ and $1b$.

Cell individual controller 61 controls the on and off of switching elements $1a$ and $1b$ provided in cell main circuit 60H, based on an arm voltage command value and a circulating voltage command value received from control device 5. Specifically, cell individual controller 61 outputs gate control signals Ga and Gb to the control electrodes of switching elements $1a$ and $1b$, respectively.

Furthermore, cell individual controller 61 detects a voltage value (that is, capacitor voltage measured value) of capacitor $1e$ and performs analog-to-digital (A/D) conversion of the detected voltage value. Cell individual controller 61 uses the detected capacitor voltage measured value Vci for voltage control of capacitor $1e$. Furthermore, cell individual controller 61 transmits the detected capacitor voltage measured value Vci to control device 5 through communication device 62.

Communication device 62 communicates with a communication circuit provided in control device 5 to receive an arm voltage command value and a circulating voltage command value from control device 5. Furthermore, communication device 62 transmits the capacitor voltage measured value Vci after A/D conversion detected by cell individual controller 61 to control device 5. The form of communication between communication device 62 and control device 5 is preferably optical communication in view of noise immunity and in view of insulation properties.

Figure 3:
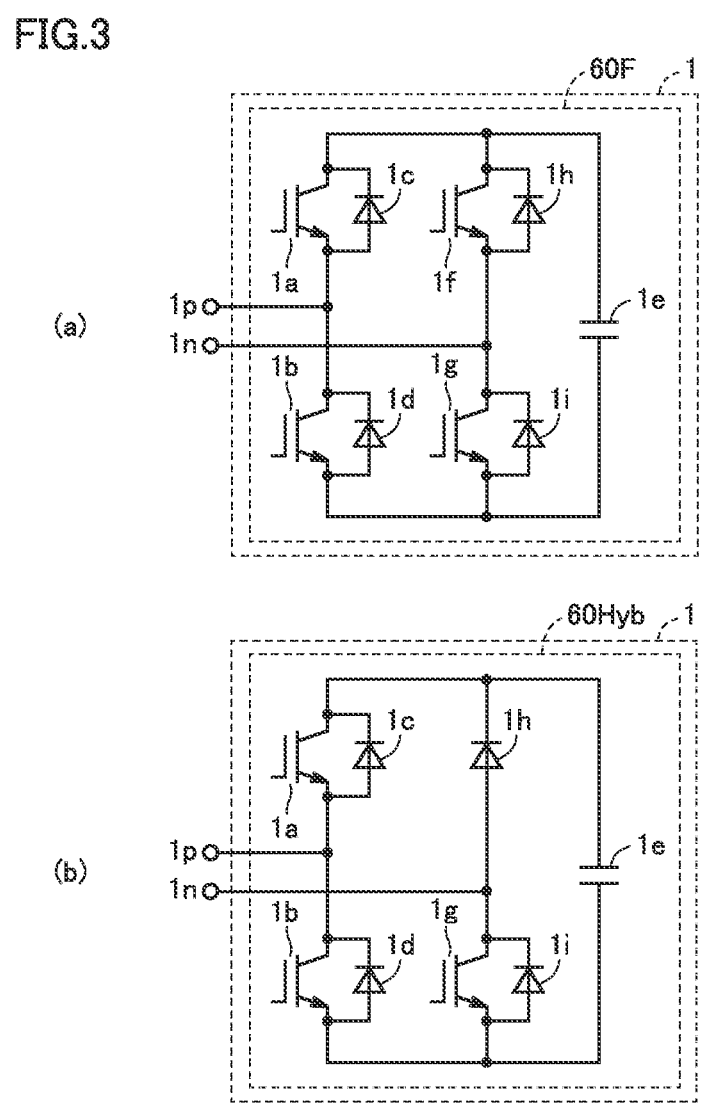

FIG. 3 is a circuit diagram showing a modification to a main circuit of converter cell 1. Converter cell 1 shown in FIG. 3$(a)$ includes a full bridge-type cell main circuit 60F. Cell main circuit 60F differs from cell main circuit 60H in FIG. 2 in that it further includes switching elements $1f$ and $1g$ connected in series and diodes $1h$ and $1i$ connected in anti-parallel with switching elements $1f$ and $1g$, respectively. The series connection circuit of switching elements $1f$ and $1g$ is connected in parallel with the series connection circuit of switching elements $1a$ and $1b$ and is connected in parallel with capacitor $1e$. Input/output terminal $1p$ is connected to the connection node of switching elements $1a$ and $1b$, and input/output terminal $1n$ is connected to the connection node of switching elements $1f$ and $1g$.

In normal operation, cell main circuit 60F shown in FIG. 3$(a)$ is controlled such that switching element $1g$ is turned on, switching element $1f$ is turned off, and switching elements $1a$ and $1b$ are alternately turned on. Thus, cell main circuit 60F can output zero voltage or positive voltage between input/output terminals $1p$ and $1n$. Cell main circuit 60F can also output zero voltage or negative voltage between input/output terminals $1p$ and $1n$ under control different from that of normal operation. Specifically, switching element $1g$ is turned off, switching element $1f$ is turned on, and switching elements $1a$ and $1b$ are alternately turned on, whereby zero voltage or negative voltage can be output.

Converter cell 1 shown in FIG. 3$(b)$ includes a hybrid-type cell main circuit 60Hyb. Cell main circuit 60Hyb has a configuration in which switching element $1f$ is eliminated from cell main circuit 60F in FIG. 3$(a)$. In normal operation, cell main circuit 60Hyb in FIG. 3$(b)$ is controlled such that switching element $1g$ is turned on and switching elements $1a$ and $1b$ are alternately turned on. Thus, cell main circuit 60Hyb can output zero voltage or positive voltage between input/output terminals $1p$ and $1n$. On the other hand, cell main circuit 60Hyb can output negative voltage when switching elements $1a$ and $1g$ are turned off, switching element $1b$ is turned on, and current flows in the direction from input/output terminal $1n$ to input/output terminal $1p$.

Self-turn-off semiconductor switching elements capable of controlling both the on operation and the off operation are used for switching elements $1a$, $1b$, $1f$, and $1g$ shown in FIG. 2, FIG. 3$(a)$, and FIG. 3$(b)$. For example, insulated gate bipolar transistors (IGBTs) or gate commutated turn-off thyristors (GCTs) can be used as switching elements $1a$, $1b$, $1f$, and $1g$.

Hereinafter, cell main circuits 60H, 60F, and 60Hyb may be collectively denoted as cell main circuit 60. Cell main circuit 60 included in converter cell 1 may have a configuration other than those shown in FIG. 2, FIG. 3$(a)$, and FIG. 3$(b)$. For simplification of description, hereinafter an example in which converter cell 1 has the configuration of cell main circuit 60H in FIG. 2 will be described.

<Overall Configuration of Control Device>

Figure 4:
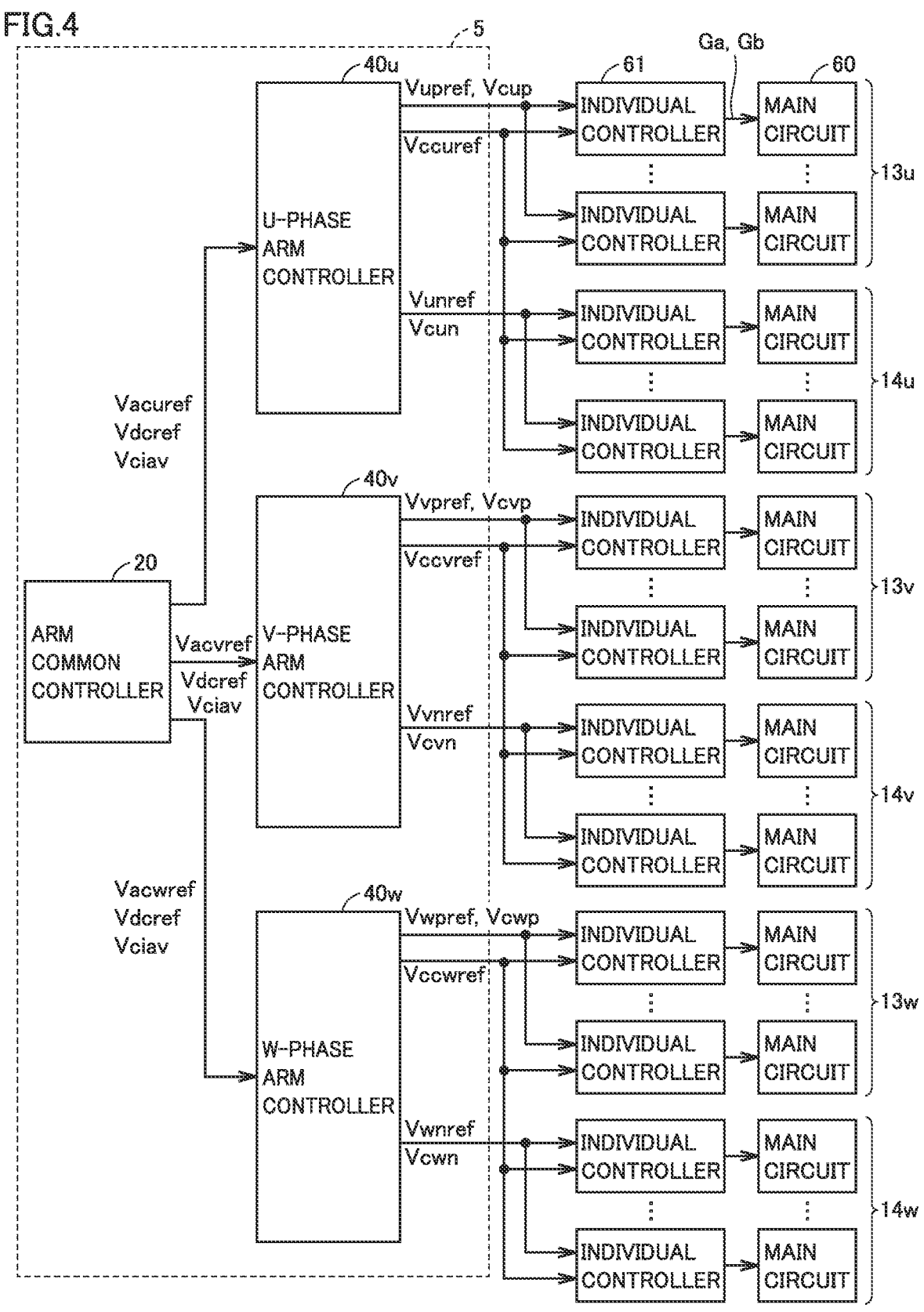
FIG. 4 is a block diagram showing an overall configuration of a control device.

FIG. 4 is a block diagram showing an overall configuration of control device 5. FIG. 4 also shows cell main circuit (corresponding to "main circuit" in FIG. 4) 60 and cell individual controller (corresponding to "individual controller" in FIG. 4) 61 provided in each converter cell 1. For simplification of illustration, communication device 62 is not illustrated in the drawing.

Referring to FIG. 4, control device 5 includes an arm common controller 20, a u-phase arm controller 40u, a v-phase arm controller 40v, and a w-phase arm controller 40w.

Arm common controller 20 generates AC voltage command values Vacuref, Vacvref, and Vacwref of u phase, v phase, and w phase, based on the arm current measured value and the AC voltage measured value. Furthermore, arm common controller 20 outputs a DC voltage command value Vdcref. Furthermore, arm common controller 20 generates Vciav that is the mean value of capacitor voltage from capacitor voltage measured values Vci of converter cells 1.

U-phase arm controller 40u generates a u-phase arm voltage command value, based on AC voltage command value Vacuref and DC voltage command value Vdcref received from arm common controller 20. The u-phase arm voltage command value includes a positive-side arm voltage command value Vupref to be output to positive-side arm 13u and a negative-side arm voltage command value Vunref to be output to negative-side arm 14u.

U-phase arm controller 40u further generates a circulating voltage command value Vccuref, based on capacitor voltage mean value Vciav received from arm common controller 20 and the u-phase circulating current value at the present time. Circulating voltage command value Vccuref is a voltage command value to be output in common to the converter cells 1 of positive-side arm 13u and negative-side arm 14u in order to control u-phase circulating current.

U-phase arm controller 40u further outputs a positive-side capacitor voltage mean value Vcup to each cell individual controller 61 of positive-side arm 13u. U-phase arm controller 40u also outputs a negative-side capacitor voltage mean value Vcun to each cell individual controller 61 of negative-side arm 14u.

V-phase arm controller 40v generates a v-phase arm voltage command value, based on AC voltage command value Vacvref and DC voltage command value Vdcref. The v-phase arm voltage command value includes a positive-side arm voltage command value Vvpref to be output to positive-side arm 13v and a negative-side arm voltage command value Vvnref to be output to negative-side arm 14v. V-phase arm controller 40v further generates a circulating voltage command value Vccvref, based on capacitor voltage mean value Vciav received from arm common controller 20 and the v-phase circulating current value at the present time. Circulating voltage command value Vccvref is a voltage command value to be output in common to the converter cells 1 of positive-side arm 13v and negative-side arm 14v in order to control v-phase circulating current. V-phase arm controller 40v further outputs a positive-side capacitor voltage mean value Vcvp to each cell individual controller 61 of positive-side arm 13v. V-phase arm controller 40v also outputs a negative-side capacitor voltage mean value Vcvn to each cell individual controller 61 of negative-side arm 14v.

W-phase arm controller 40w generates a w-phase arm voltage command value, based on AC voltage command value Vacwref and DC voltage command value Vdcref. The w-phase arm voltage command value includes a positive-side arm voltage command value Vwpref to be output to positive-side arm 13w and a negative-side arm voltage command value Vwnref to be output to negative-side arm 14w. W-phase arm controller 40w further generates a circulating voltage command value Vccwref, based on capacitor voltage mean value Vciav received from arm common controller 20 and the w-phase circulating current value at the present time. Circulating voltage command value Vccwref is a voltage command value to be output in common to the converter cells 1 of positive-side arm 13w and negative-side arm 14w in order to control w-phase circulating current. W-phase arm controller 40w further outputs a positive-side capacitor voltage mean value Vcwp to each cell individual controller 61 of positive-side arm 13w. W-phase arm controller 40w also outputs a negative-side capacitor voltage mean value Vcwn to each cell individual controller 61 of negative-side arm 14w.

Arm controller 40u, 40v, 40w of each phase transmits the arm voltage command value, the circulating voltage command value, and the capacitor voltage mean value to cell individual controller 61 of the corresponding converter cell 1 through an optical communication channel.

Hardware Configuration Example of Control Device

Figure 5:
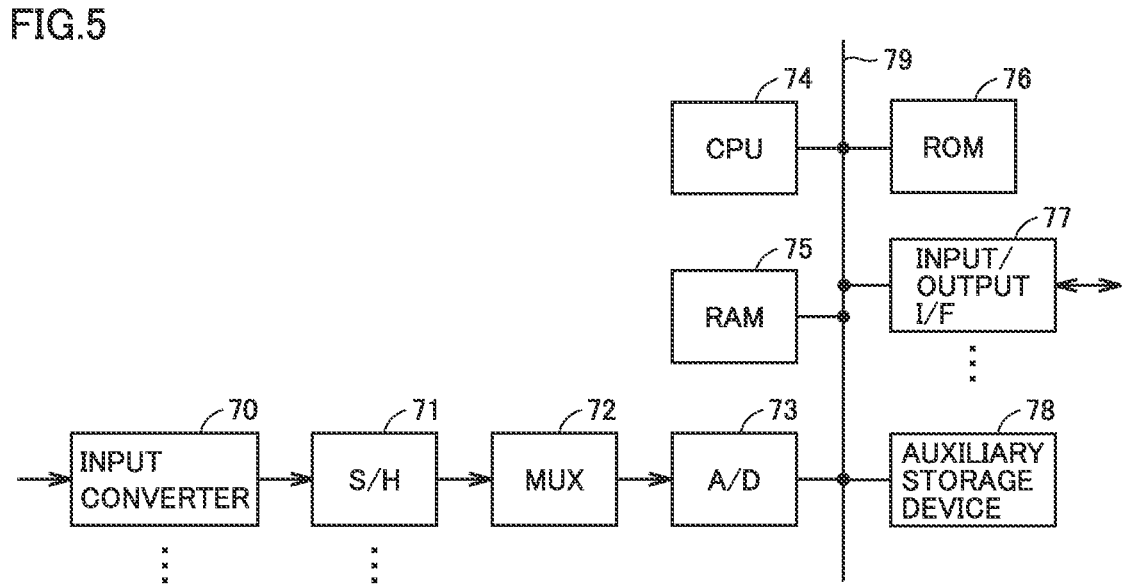
FIG. 5 is a block diagram showing an exemplary hardware configuration of the control device.

FIG. 5 is a block diagram showing an exemplary hardware configuration of control device 5. Control device 5 in FIG. 5 is configured based on a computer. Referring to FIG. 5, control device 5 includes one or more input converters 70, one or more sample and hold (S/H) circuits 71, a multiplexer (MUX) 72, and an A/D converter 73. Control device 5 further includes one or more central processing units (CPU) 74, a random access memory (RAM) 75, and a read only memory (ROM) 76. Control device 5 further includes one or more input/output interfaces 77, an auxiliary storage device 78, and a bus 79 connecting the components above to each other.

Input converter 70 includes an auxiliary transformer for each input channel. Each auxiliary transformer converts a detection signal from each electrical quantity detector in FIG. 1 into a signal at a voltage level suitable for subsequent signal processing.

Sample and hold circuit 71 is provided for each input converter 70. Sample and hold circuit 71 samples a signal representing the electrical quantity received from the corresponding input converter 70 at a predetermined sampling frequency and holds the signal.

Multiplexer 72 successively selects the signals held by a plurality of sample and hold circuits 71. A/D converter 73 converts a signal selected by multiplexer 72 into a digital value. A plurality of A/D converters 73 may be provided to perform A/D conversion of detection signals of a plurality of input channels in parallel.

CPU 74 controls the entire control device 5 and performs computational processing under instructions of a program. RAM 75 as a volatile memory and ROM 76 as a nonvolatile memory are used as a main memory of CPU 74. ROM 76 stores a program and setting values for signal processing. Auxiliary storage device 78 is a nonvolatile memory having a larger capacity than ROM 76 and stores a program and data such as electrical quantity detected values.

Input/output interface 77 is an interface circuit for communication between CPU 74 and an external device.

At least a part of control device 5 may be configured using circuitry such as a field programmable gate array (FPGA) and an application specific integrated circuit (ASIC). Cell individual controller 61 for each converter cell may also be configured based on a computer in the same manner as control device 5 and may be at least partially configured with circuitry such as an FPGA and an ASIC. Alternatively, at least a part of control device 5 and at least a part of cell individual controller 61 may be configured with an analog circuit.

\<Operation of Arm Common Controller\>

(Overview)

Figure 6:
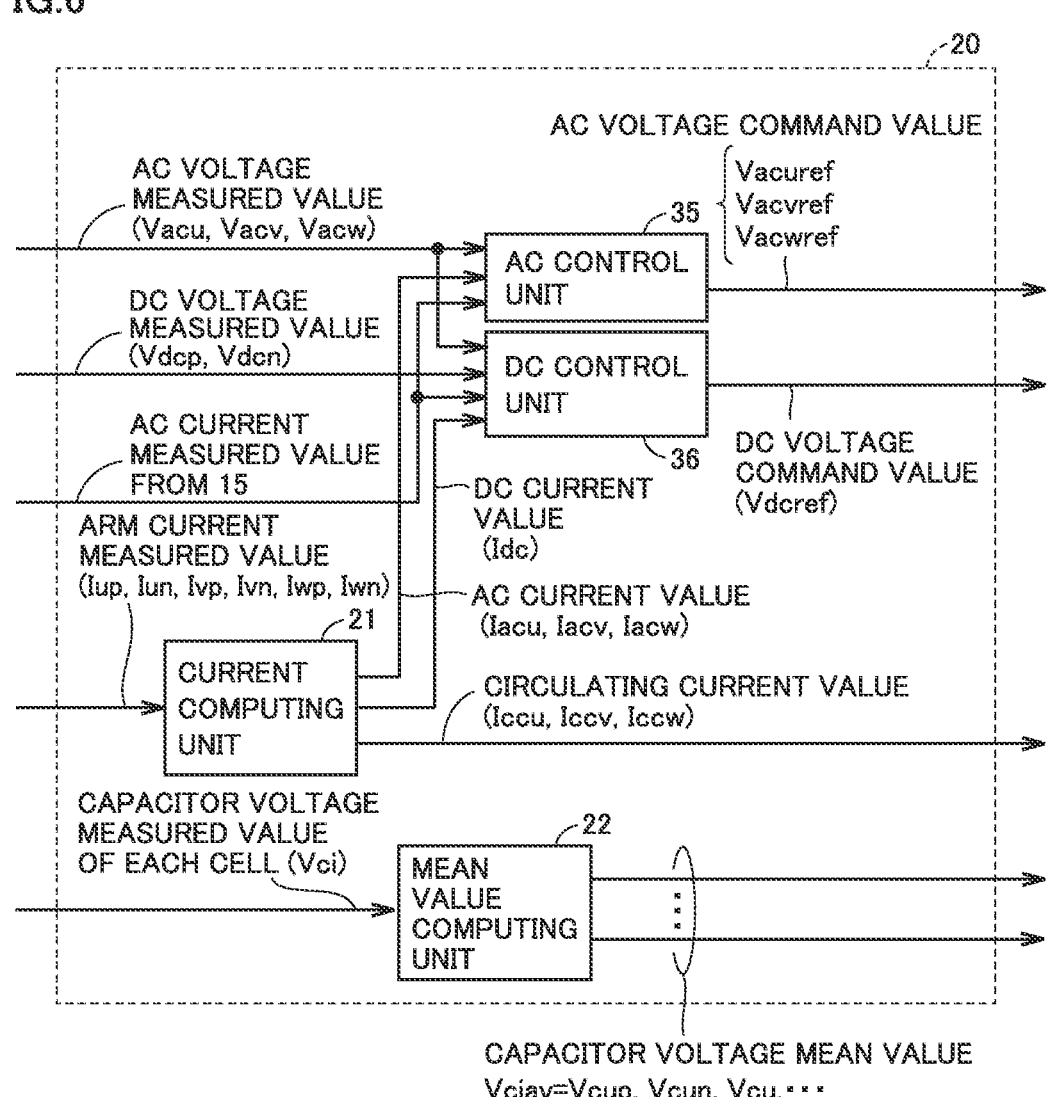
FIG. 6 is a block diagram showing the operation of an arm common controller.

FIG. 6 is a block diagram showing the operation of arm common controller 20. Referring to FIG. 6, arm common controller 20 includes an AC control unit 35, a DC control unit 36, a current computing unit 21, and a mean value computing unit 22. The functions of these components are implemented by, for example, CPU 74.

AC control unit 35 generates AC voltage command values Vacuref, Vacvref, and Vacwref, based on AC voltage measured values Vacu, Vacv, and Vacw detected by AC voltage detector 10, the AC current measured values detected by AC current detector 15, and AC current values Iacu, Iacy, and Iacw computed by current computing unit 21. The detailed operation of AC control unit 35 will be described later.

DC control unit 36 generates DC voltage command value Vdcref. The configuration of DC control unit 36 varies between when the power conversion device operates as a rectifier to supply power from the AC circuit to the DC circuit and when the power conversion device operates as an inverter. When the power conversion device operates as a rectifier, DC control unit 36 generates DC voltage command value Vdcref, based on DC voltage measured values Vdcp and Vdcn. On the other hand, when the power conversion device operates as an inverter, DC control unit 36 generates DC voltage command value Vdcref, based on AC voltage measured values Vacu, Vacv, and Vacw, AC current measured value of each phase detected by AC current detector 15, and DC current value Idc computed by current computing unit 21. The detailed operation of DC control unit 36 will be described later.

(Operation of Current Computing Unit)

Current computing unit 21 calculates DC current value Idc, AC current values Iacu, Iacy, and Iacw, and circulating current values Iccu, Iccv, and Iccw, based on the arm current measured values. Specifically, the procedure is as follows.

As shown in FIG. 1, AC terminal Nu that is the connection point between positive-side arm 13$u$ and negative-side arm 14$u$ of leg circuit 8$u$ is connected to transformer 3. AC current value Iacu flowing from AC terminal Nu toward transformer 3 is therefore a current value obtained by subtracting negative-side arm current measured value Iun from positive-side arm current measured value Iup as indicated by the following equation (1).

$$Iacu=Iup-Iun \qquad (1)$$

When the mean value of positive-side arm current measured value Iup and negative-side arm current measured value Iun is a common current flowing through positive-side arm 13$u$ and negative-side arm 14$u$, this current is a leg current Icomu flowing through the DC terminal of leg circuit 8$u$. Leg current Icomu is represented by the following equation (2).

$$Icomu=(Iup+Iun)/2 \qquad (2)$$

For the v phase, AC current value Iacy and leg current Icomv are also calculated using positive-side arm current measured value Ivp and negative-side arm current measured value Ivn, and for the w phase, AC current value Iacw and leg current Icomw are also calculated using positive-side arm current measured value Iwp and negative-side arm current measured value Iwn. Specifically, these are represented by the following equations (3) to (6).

$$Iacv=Ivp-Ivn \qquad (3)$$

$$Icomv=(Ivp+Ivn)/2 \qquad (4)$$

$$Iacw=Iwp-Iwn \qquad (5)$$

$$Icomw=(Iwp+Iwn)/2 \qquad (6)$$

The DC terminal on the positive side of leg circuit 8$u$, 8$v$, 8$w$ of each phase is connected in common as positive-side DC terminal Np, and the DC terminal on the negative side is connected in common as negative-side DC terminal Nn. Based on this configuration, the current value obtained by adding leg current Icomu, Icomv, Icomw of each phase is a DC current value Idc flowing from the positive-side terminal of DC circuit 4 and back to DC circuit 4 through the negative-side terminal. DC current value Idc is therefore represented by equation (7).

$$Idc=Icomu+Icomv+Icomw \qquad (7)$$

The DC current component included in leg current can be shared equally among the phases so that the current capacity of cells can be made equal. Considering this, the difference between the leg current and ⅓ of the DC current value can be computed as the current value of circulating current that does not flow to DC circuit 4 but flows between the legs of the phases. Specifically, circulating current values Iccu, Iccv, and Iccw of u phase, v phase, and w are represented by the following equations (8), (9), and (10), respectively.

$$Iccu=Icomu-Idc/3 \qquad (8)$$

$$Iccv=Icomv-Idc/3 \qquad (9)$$

$$Iccw=Icomw-Idc/3 \qquad (10)$$

(Operation of Mean Value Computing Unit)

Mean value computing unit 22 calculates a variety of capacitor voltage mean value Vciav from individual capacitor voltage measured values Vci detected in converter cells 1.

Specifically, mean value computing unit 22 calculates all-capacitor voltage mean value Vcall that is the voltage mean value of all the capacitors included in the entire power converter 6. Mean value computing unit 22 also calculates positive-side capacitor voltage mean value Vcup that is the voltage mean value of the capacitors included in positive-side arm 13$u$, negative-side capacitor voltage mean value Vcun that is the voltage mean value of the capacitors included in negative-side arm 14$u$, and capacitor voltage mean value Vcu that is the voltage mean value of all the capacitors included in the entire leg circuit 8$u$.

Mean value computing unit 22 calculates positive-side capacitor voltage mean value Vcvp in positive-side arm 13$v$, negative-side capacitor voltage mean value Vcvn in negative-side arm 14$v$, and capacitor voltage mean value Vcv in the entire leg circuit 8$v$.

Mean value computing unit 22 calculates positive-side capacitor voltage mean value Vcwp in positive-side arm 13$w$, negative-side capacitor voltage mean value Vcwn in negative-side arm 14$w$, and capacitor voltage mean value Vcw in the entire leg circuit 8$w$.

In the present description, capacitor voltage mean value Vciav is used as a generic term of various mean values described above.

(Detailed Operation of AC Control Unit)

Figure 7:
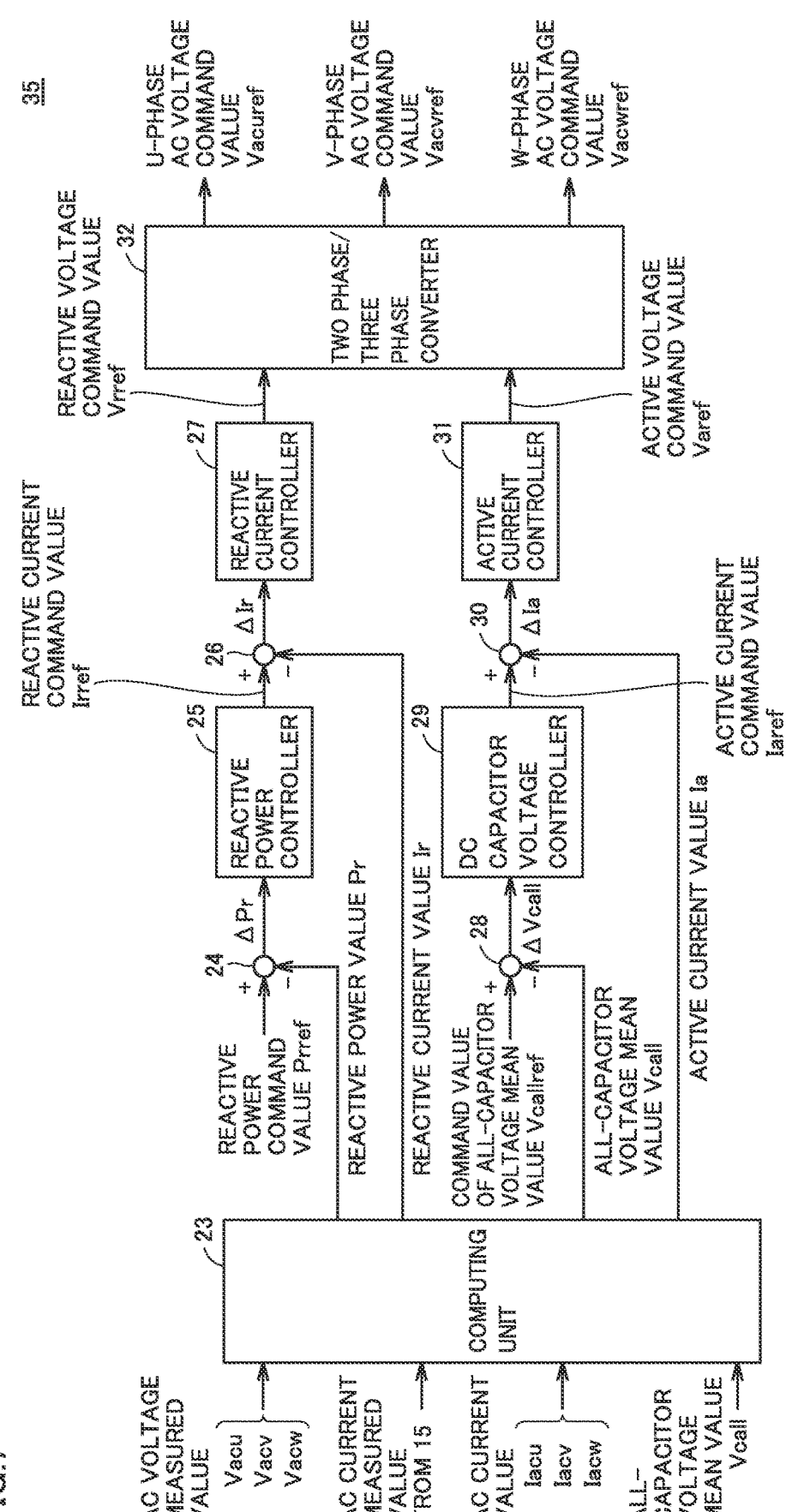
FIG. 7 is a diagram for explaining the operation of an AC control unit in the arm common controller.

FIG. 7 is a diagram for explaining the operation of AC control unit 35 in arm common controller 20. Referring to FIG. 7, AC control unit 35 includes a computing unit 23, a reactive power controller 25, a reactive current controller 27, a DC capacitor voltage controller 29, and an active current controller 31. AC control unit 35 further includes subtracters 24, 26, 28, and 30 and a two phase/three phase converter 32.

Computing unit 23 receives AC voltage measured value Vacu, Vacv, Vacw of each phase, AC current measured value of each phase of AC circuit 2 detected by AC current detector 15, and AC current value Iacu, Iacv, Iacw calculated by current computing unit 21. Computing unit 23 calculates a reactive power value Pr, based on AC voltage measured value Vacu, Vacv, Vacw of each phase and AC current measured value of each phase. Computing unit 23 further calculates an active current value Ia and a reactive current value Ir, based on AC voltage measured value Vacu, Vacv, Vacw of each phase and the calculated AC current value Iacu, Iacv, Iacw.

Subtracter 24 calculates a deviation ΔPr between the applied reactive power command value Prref and reactive power value Pr calculated by computing unit 23. Reactive power command value Prref may be a fixed value or may be a variable value obtained by some computation.

Reactive power controller 25 generates a reactive current command value Irref for controlling reactive current output from power converter 6 so that deviation ΔPr calculated by subtracter 24 becomes zero. Reactive power controller 25 may be configured as a PI controller that performs proportional computation and integral computation on deviation ΔPr or may be configured as a PID controller that additionally performs derivative computation. Alternatively, the configuration of another controller for use in feedback control may be used as reactive power controller 25. As a result, feedback control is performed such that reactive power value Pr is equal to reactive power command value Prref.

Subtracter 26 calculates a deviation ΔIr between reactive current command value Irref and reactive current value Ir calculated by computing unit 23.

Reactive current controller 27 generates a reactive voltage command value Vrref for controlling reactive voltage output from power converter 6 so that deviation ΔIr calculated by subtracter 26 becomes zero. Reactive current controller 27 may be configured as a PI controller, a PID controller, or another controller for use in feedback control. As a result, feedback control is performed such that reactive current value Ir is equal to reactive current command value Irref.

Subtracter 28 calculates a deviation ΔVcall between command value Vcallref applied for the all-capacitor voltage mean value and all-capacitor voltage mean value Vcall. As described above, all-capacitor voltage mean value Vcall is obtained by averaging capacitor voltage measured values Vci of individual cells over the entire power conversion device. Command value Vcallref may be a fixed value or may be a variable value obtained by some computation.

DC capacitor voltage controller 29 generates an active current command value Iaref for controlling active current output from power converter 6 so that deviation ΔVcall calculated by subtracter 28 becomes zero. DC capacitor voltage controller 29 may be configured as a PI controller, a PID controller, or another controller for used in feedback control. As a result, feedback control is performed such that all capacitor voltage mean value Vcall is equal to command value Vcallref.

Subtracter 30 calculates a deviation ΔIa between active current command value Iaref and active current value Ia calculated by computing unit 23.

Active current controller 31 generates an active voltage command value Varef for controlling active voltage output from power converter 6 so that deviation ΔIa calculated by subtracter 30 becomes zero. Active current controller 31 may be configured as a PI controller, a PID controller, or another controller for use in feedback control. As a result, feedback control is performed such that active current value Ia is equal to active current command value Iaref.

Two phase/three phase converter 32 generates u-phase AC voltage command value Vacuref, v-phase AC voltage command value Vacvref, and w-phase AC voltage command value Vacwref by coordinate transformation from active voltage command value Varef and reactive voltage command value Vrref. The coordinate transformation by two phase/three phase converter 32 can be implemented by, for example, inverse Park transformation and inverse Clarke transformation. Alternatively, the coordinate transformation by two phase/three phase converter 32 can be implemented by inverse Park transformation and spatial vector transformation.

In FIG. 7, the configuration in which AC control unit 35 includes reactive power controller 25 has been described. Instead of reactive power controller 25, a system voltage controller may be provided that performs computation on a deviation between a system voltage command value and a system voltage measured value. As a result, feedback control is performed such that the system voltage measured value is equal to the system voltage command value.

(Detailed Operation of DC Control Unit)

Figure 8:
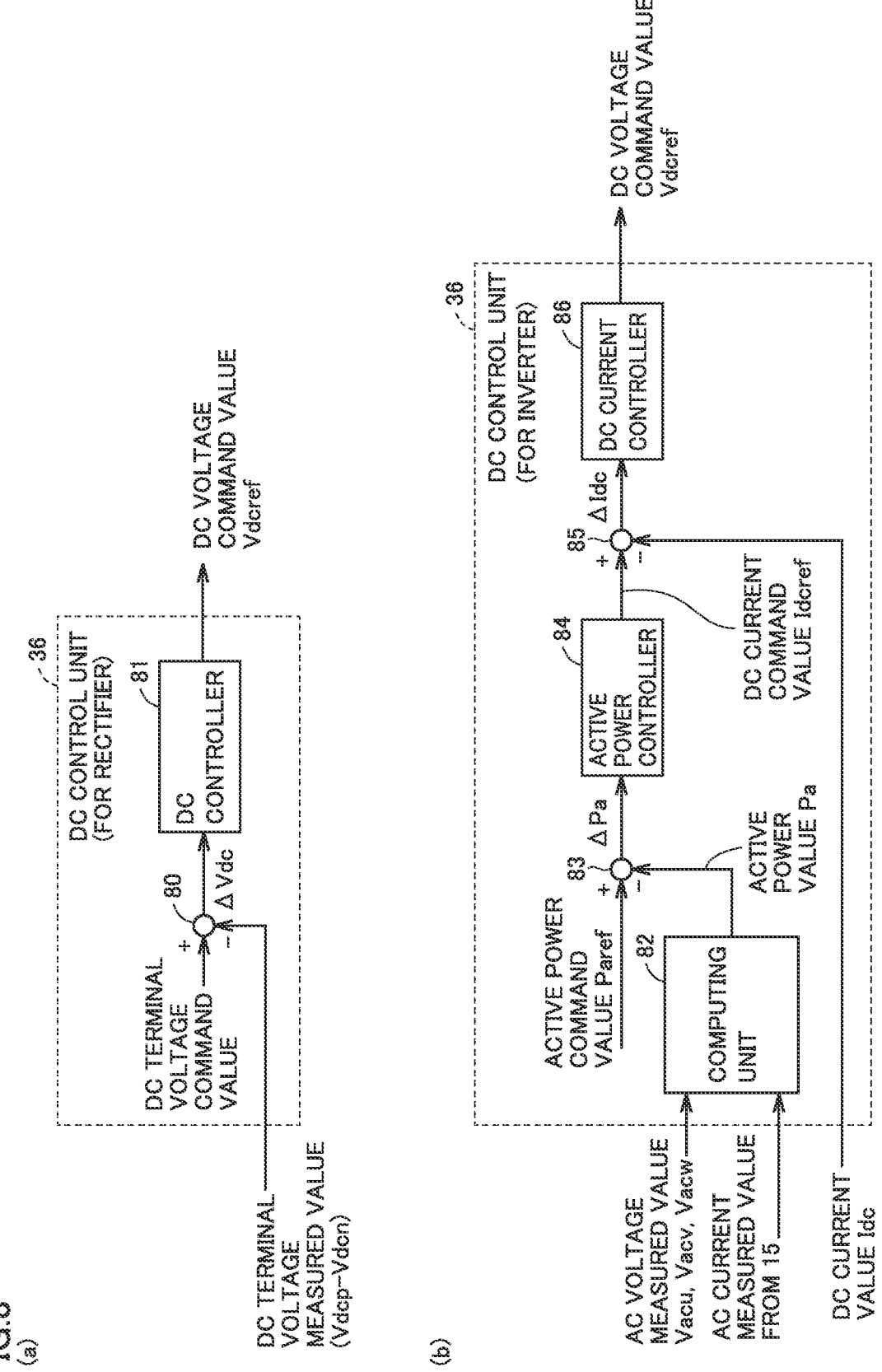
FIG. 8 is a diagram for explaining the operation of a DC control unit in the arm common controller.

FIG. 8 is a diagram for explaining the operation of DC control unit 36 in arm common controller 20. FIG. 8(*a*) is a functional block diagram in a case where power conversion device 100 operates as a rectifier that supplies power from AC circuit 2 to DC circuit 4. FIG. 8(*b*) is a functional block diagram in a case where power conversion device 100 operates as an inverter that supplies active power from DC circuit 4 to AC circuit 2. Power conversion device 100 provided at one end of a DC transmission line includes a DC control unit 36 having the configuration in FIG. 8(*a*), and power conversion device 100 provided at the other end of the DC transmission line includes a DC control unit 36 having the configuration in FIG. 8(*b*).

Referring to FIG. 8(*a*), DC control unit 36 for rectifier includes a subtracter 80 and a DC controller 81. Subtracter 80 calculates a deviation ΔVdc between the applied DC terminal voltage command value and DC terminal voltage value Vdc (=Vdcp−Vdcn). DC terminal voltage value Vdc is a transmission end voltage obtained from DC voltage measured values Vdcp and Vdcn detected by DC voltage detectors 11*a* and 11*b*. DC controller 81 generates a DC voltage command value Vdcref for controlling DC voltage output from power converter 6 so that deviation ΔVdc becomes zero. For example, DC controller 81 may be configured as a PI controller, a PID controller, or another controller for use in feedback control. As a result, feedback control is performed such that DC terminal voltage value Vdc is equal to the DC terminal voltage command value.

Referring to FIG. 8(*b*), DC control unit 36 for inverter includes a computing unit 82, subtracters 83 and 85, an active power controller 84, and a DC current controller 86.

Computing unit 82 receives AC voltage measured value Vacu, Vacv, Vacw of each phase and AC current measured value of each phase of AC circuit 2 detected by AC current detector 15. Computing unit 82 calculates an active power value Pa, based on these voltage values and current values. Subtracter 83 calculates a deviation ΔPa between the applied active power command value Paref and the calculated active power value Pa. Active power command value Paref may be a fixed value or may be a variable value obtained by some computation.

Active power controller 84 generates a DC current command value Idcref for controlling DC current output from power converter 6 so that deviation ΔPa calculated by subtracter 83 becomes zero. Active power controller 84 may be configured as, for example, a PI controller, a PID controller, or another controller for use in feedback control. As a result, feedback control is performed such that active power value Pa is equal to active power command value Paref.

Subtracter 85 calculates a deviation ΔIdc between DC current command value Idcref and DC current value Idc. As described above, DC current value Idc is calculated by current computing unit 21 using the arm current measured values.

DC current controller 86 generates a DC voltage command value Vdcref for controlling DC voltage output from power converter 6 so that deviation ΔIdc calculated by subtracter 85 becomes zero. DC current controller 86 may be configured as, for example, a PI controller, a PID controller, or another controller for used in feedback control. As a result, feedback control is performed such that DC current value Idc is equal to DC current command value Idcref.

<Operation of Arm Controller of Each Phase>

The operation of arm controller 40u, 40v, 40w of each phase will be described. In the following, the operation of u-phase arm controller 40u is described as a representative. The operation of v-phase arm controller 40v and w-phase arm controller 40w is the same as the operation described below, where the u phase should read as the v phase and the w phase.

Figure 9:
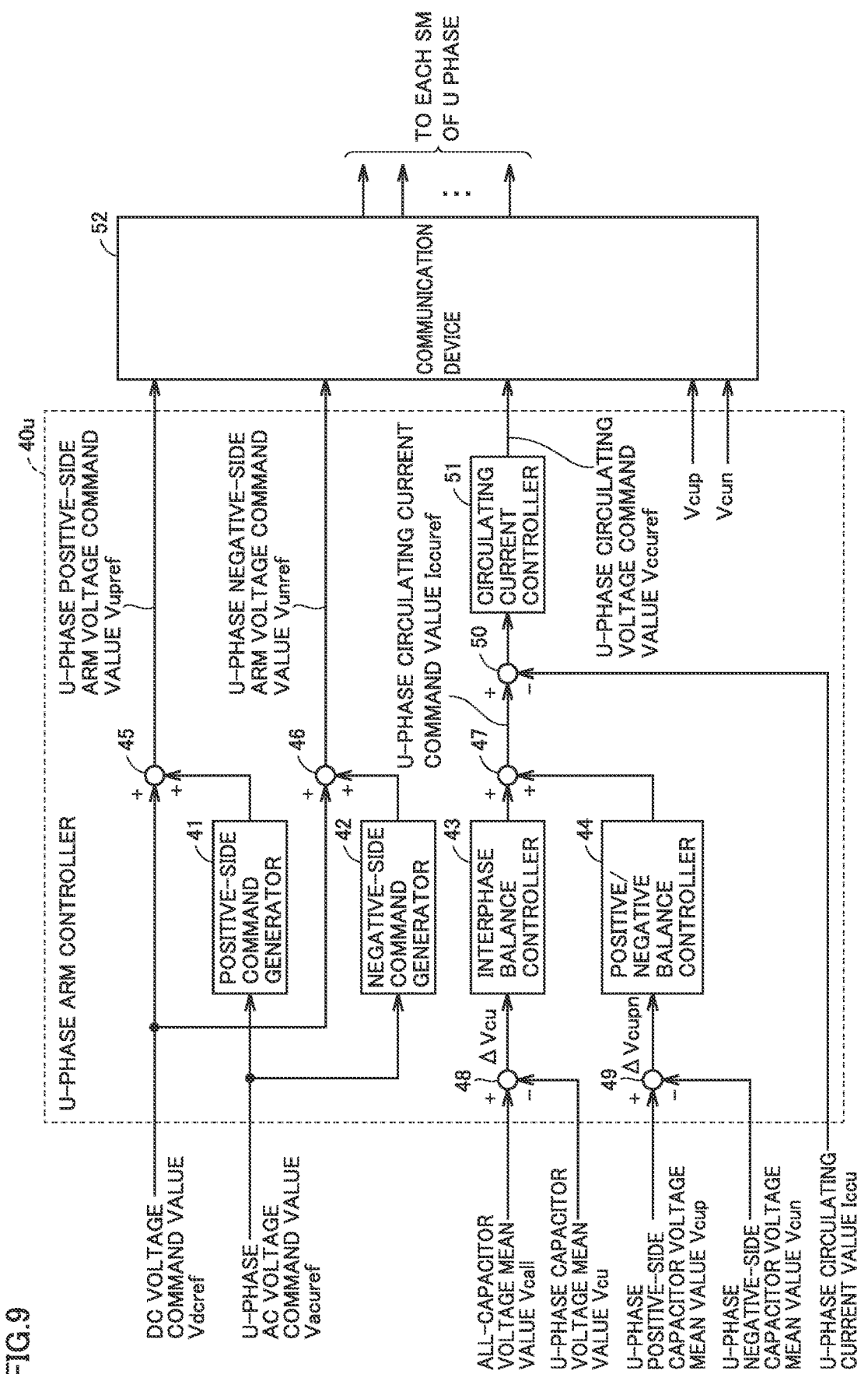
FIG. 9 is a block diagram showing the operation of a u-phase arm controller.

FIG. 9 is a block diagram showing the operation of u-phase arm controller 40u. Referring to FIG. 9, u-phase arm controller 40u includes a positive-side command generator 41, a negative-side command generator 42, an interphase balance controller 43, a positive/negative balance controller 44, and a circulating current controller 51. U-phase arm controller 40u further includes adders 45, 46, and 47 and subtracters 48, 49, and 50.

Adder 45 adds DC voltage command value Vdcref to a value obtained by multiplying AC voltage command value Vacuref by −1 by positive-side command generator 41. U-phase positive-side arm voltage command value Vupref is thus generated.

Adder 46 adds DC voltage command value Vdcref to a value obtained by multiplying AC voltage command value Vacuref by +1 by negative-side command generator 42. U-phase negative-side arm voltage command value Vunref is thus generated.

Subtracter 48 calculates a deviation ΔVcu between all-capacitor voltage mean value Vcall and u-phase capacitor voltage mean value Vcu. Deviation ΔVcu means variations in voltage of capacitors between different phases (that is, capacitor voltage variations).

Interphase balance controller 43 performs computation on deviation ΔVcu calculated by subtracter 48. Interphase balance controller 43 may be configured as, for example, a PI controller, a PID controller, or another controller for use in feedback control. As a result, feedback control is performed such that capacitor voltage mean value Vcu is equal to all-capacitor voltage mean value Vcall.

Subtracter 49 calculates a deviation ΔVcupn between u-phase positive-side capacitor voltage mean value Vcup and u-phase negative-side capacitor voltage mean value Vcun. Deviation ΔVcupn means variations in voltage of capacitors between positive-side arm 13u and negative-side arm 14u.

Positive/negative balance controller 44 performs computation on deviation ΔVcupn calculated by subtracter 49. Positive/negative balance controller 44 may be configured as, for example, a PI controller, a PID controller, or another controller for use in feedback control. As a result, feedback control is performed such that negative-side capacitor voltage mean value Vcun is equal to positive-side capacitor voltage mean value Vcup.

Adder 47 adds the computation result by interphase balance controller 43 to the computation result by positive/negative balance controller 44 to generate u-phase circulating current command value Iccuref.

Subtracter 50 calculates a deviation between circulating current command value Iccuref and circulating current value Iccu. Circulating current controller 51 performs computation on the deviation calculated by subtracter 50 to generate u-phase circulating voltage command value Vccuref Circulating current controller 51 may be configured as, for example, a PI controller, a PID controller, or another controller for use in feedback control.

Communication device 52 transmits positive-side arm voltage command value Vupref, circulating voltage command value Vccuref, and positive-side capacitor voltage mean value Vcup to cell individual controller 61 of each converter cell 1 included in positive-side arm 13u. Communication device 52 further transmits negative-side arm voltage command value Vunref, circulating voltage command value Vccuref, and negative-side capacitor voltage mean value Vcun to cell individual controller 61 of each converter cell 1 included in negative-side arm 14u.

In the description above, the calculation of positive-side arm voltage command value Vupref and negative-side arm voltage command value Vunref and the calculation of circulating voltage command value Vccuref are independent of each other. Therefore, the calculation cycle of circulating voltage command value Vccuref can be made shorter than the calculation cycle of positive-side arm voltage command value Vupref and negative-side arm voltage command value Vunref. As a result, the controllability of circulating current that changes faster than AC current of AC circuit 2 and DC current of DC circuit 4 can be improved.

<Operation of Cell Individual Controller>

The operation of cell individual controller 61 provided in each converter cell 1 will be described. In the following, the operation of cell individual controller 61 for positive-side arm 13u will be described as a representative. The operation of cell individual controller 61 for negative-side arm 14u is the same as the one described below, where the positive-side should read as the negative-side. The operation of cell individual controllers 61 for the v phase and the w phase is the same as the one described below, where the u phase should read as the v phase or the w phase.

Figure 10:
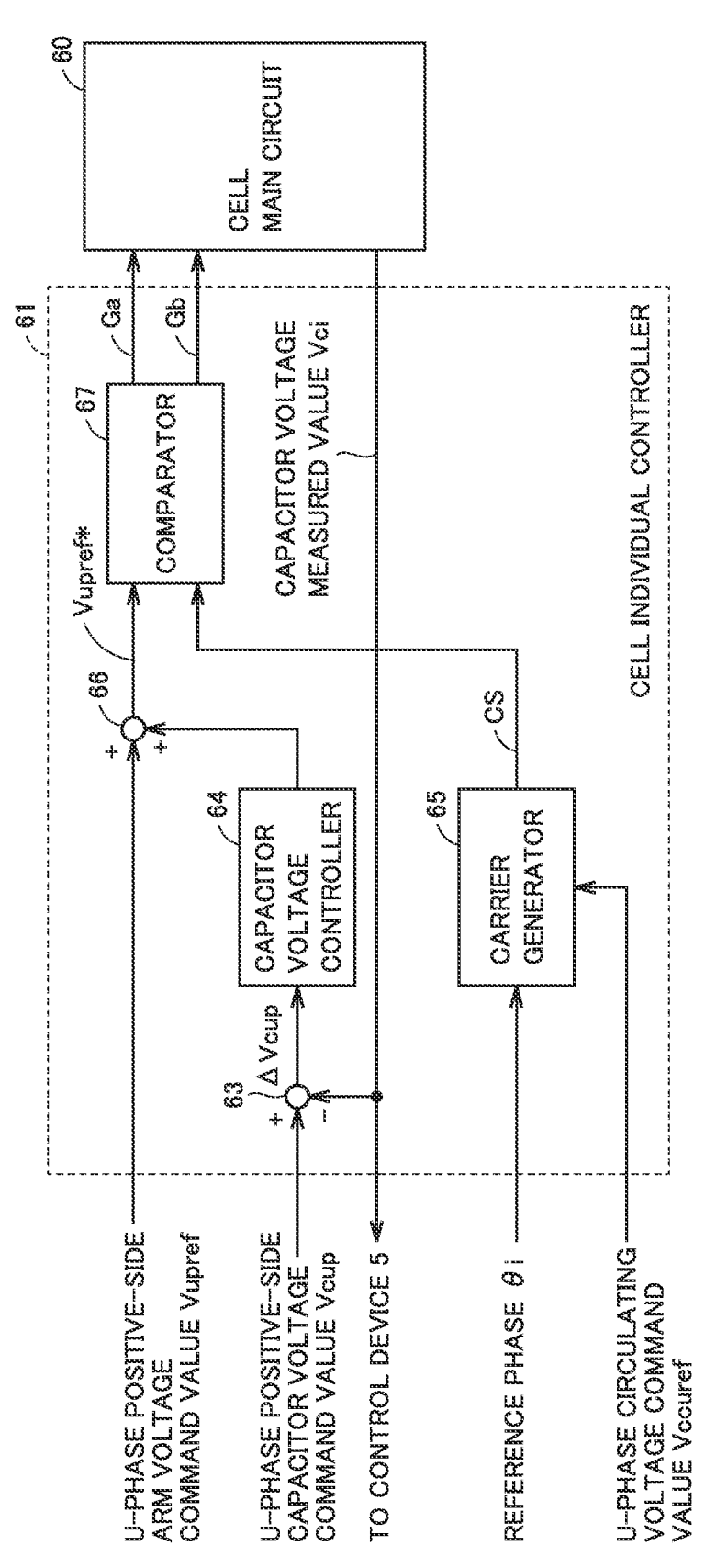
FIG. 10 is a block diagram showing the operation of a cell individual controller for a positive-side arm.

FIG. 10 is a block diagram showing the operation of cell individual controller 61 for positive-side arm 13u. In FIG. 10, the A/D converter for converting capacitor voltage measured value Vci into a digital value is not shown. In FIG. 10, communication device 62 that performs communication between cell individual controller 61 and control device 5 is also not shown.

Referring to FIG. 10, cell individual controller 61 includes a capacitor voltage controller 64, a carrier generator 65, a comparator 67, a subtracter 63, and an adder 66.

Subtracter 63 calculates a deviation ΔVcup between positive-side capacitor voltage mean value Vcup as a capacitor voltage command value and capacitor voltage measured value Vci. As explained with reference to FIG. 9, positive-side capacitor voltage mean value Vcup is received from the corresponding u-phase arm controller 40u. Capacitor voltage measured value Vci is detected in the corresponding cell main circuit 60.

Capacitor voltage controller 64 performs computation on deviation ΔVcup calculated by subtracter 63. Capacitor voltage controller 64 may be configured as, for example, a PI controller, a PID controller, or another controller for use in feedback control. As a result, feedback control is performed such that capacitor voltage measured value Vci is equal to positive-side capacitor voltage mean value Vcup.

Adder 66 adds u-phase positive-side arm voltage command value Vupref to the output of capacitor voltage controller 64 to generate a final u-phase positive-side arm voltage command value Vupref*.

Carrier generator 65 generates a carrier signal CS for use in phase shift pulse width modulation (PWM) control. The phase shift PWM control allows the timings of PWM signals output to a plurality of converter cells 1 in positive-side arm 13u to be shifted from each other. This can reduce harmonic components included in a synthesized voltage of output voltages of converter cells 1. For example, cell individual controllers 61 provided in converter cells 1 generate carrier signals CS shifted in phase from each other, based on a common reference phase θi received from control device 5. For example, a triangular wave is used as carrier signal CS.

Carrier generator 65 further modulates the generated carrier signal CS in accordance with circulating voltage command value Vccuref Carrier generator 65 then outputs the modulated carrier signal to comparator 67 on the subsequent stage. The pulse width of PWM signal (that is, gate control signals Ga and Gb) generated in comparator 67 on the subsequent stage changes in accordance with circulating voltage command value Vccuref. As a result, the deviation between circulating current command value Iccuref and circulating current value Iccu is controlled to be smaller.

Comparator 67 compares positive-side arm voltage command value Vupref* with carrier signal CS modulated based on circulating voltage command value Vccuref. In accordance with the comparison result, comparator 67 generates gate control signals Ga and Gb as PWM modulation signals for controlling switching elements 1a and 1b included in cell main circuit 60. Gate control signals Ga and Gb are respectively supplied to the control electrodes of switching elements 1a and 1b in FIG. 2. As a result, the output voltage of cell main circuit 60 is controlled in accordance with u-phase circulating current value Iccu.

<Switching of Switching Frequency>

A configuration of switching the switching frequency of the switching elements in each converter cell 1 using a variety of control command values for power converter 6 will be described.

(Overview)

Figure 11:
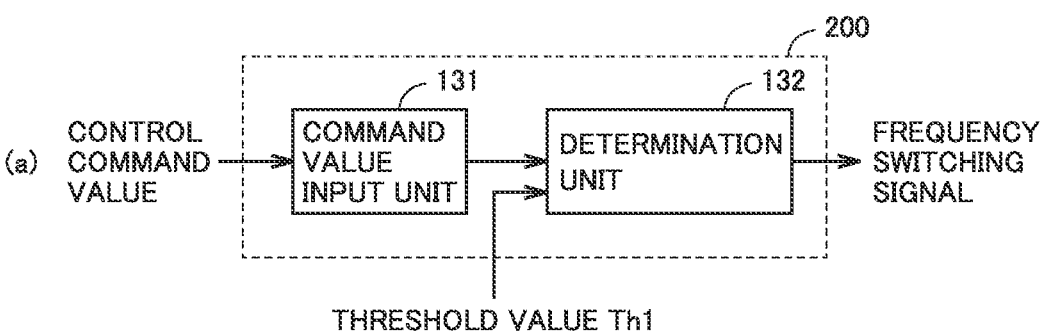
FIG. 11 is a diagram for explaining the operation of a frequency switching unit according to a first embodiment.
Figure 11:
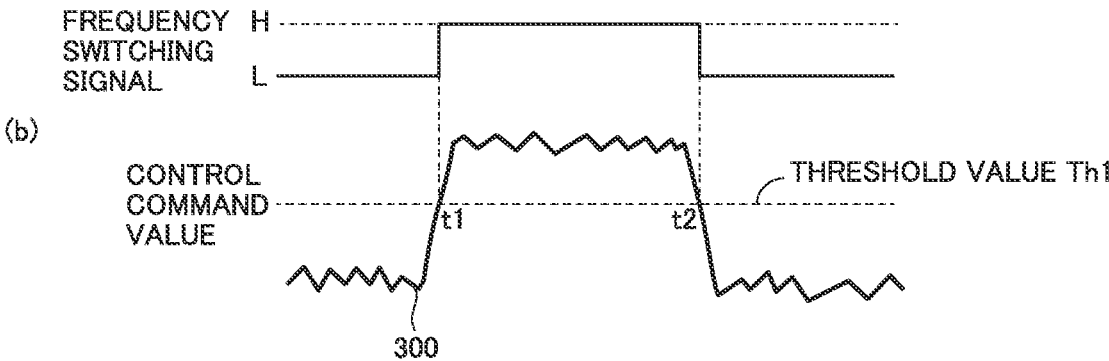

FIG. 11 is a diagram for explaining the operation of a frequency switching unit 200 according to a first embodiment. Specifically, FIG. 11(a) is a block diagram for explaining the function of frequency switching unit 200 included in control device 5. FIG. 11(b) is a timing chart for explaining the timing at which a frequency switching signal is output. The function of frequency switching unit 200 is typically implemented by CPU 74.

Referring to FIG. 11(a), frequency switching unit 200 includes a command value input unit 131 and a determination unit 132. Command value input unit 131 accepts an input of a control command value for power converter 6 and outputs the control command value to determination unit 132. The control command value is, for example, an output power command value, a reactive current command value, a modulation ratio command value, an AC voltage command value, and an AC current command value.

Determination unit 132 outputs a frequency switching signal for switching the switching frequency of the switching elements in each converter cell 1, based on a threshold value Th1 and a control command value. Referring to FIG. 11(b), a waveform 300 is a waveform indicating a control command value. In a period before time t1, the control command value is less than threshold value Th1. In this case, determination unit 132 outputs a frequency switching signal at low level (which hereinafter may be referred to as "frequency switching signal L"). After time t1, in a period before time t2, the control command value is equal to or greater than threshold value Th1. In this case, determination unit 132 outputs a frequency switching signal at high level (which hereinafter may be referred to as "frequency switching signal H"). In a period after time t2, the control command value is less than threshold value Th1. In this case, determination unit 132 outputs frequency switching signal L. Threshold value Th1 is a generic term of a prescribed value set for each of a variety of control command values.

The frequency switching signal output from determination unit 132 is input to carrier generator 65 in FIG. 10. When an input of frequency switching signal L is being accepted from control device 5, carrier generator 65 sets the frequency of carrier signal CS (hereinafter referred to as "carrier frequency") to a frequency F (for example, 180 Hz) used when power converter 6 is operated normally. Thus, switching elements 1a and 1b in each converter cell 1 perform switching operation in accordance with the carrier frequency (that is, switching frequency) set to frequency F. The carrier frequency is set with a multiple (that is, the number of pulses) of a fundamental frequency (for example, 50 Hz, 60 Hz). The carrier frequency may be set to a prescribed frequency (for example, 180 Hz), irrespective of the fundamental frequency, or may be set to be lower on the 60 Hz system side than on the 50 Hz system side.

On the other hand, when an input of frequency switching signal H is being accepted from control device 5, carrier generator 65 sets the carrier frequency to a frequency FH higher than frequency F. Frequency FH is approximately several times higher than frequency F. Thus, switching elements 1a and 1b in each converter cell 1 perform switching operation at a higher speed in accordance with the carrier frequency set to frequency FH.

In short, when the control command value for power converter 6 becomes equal to or greater than threshold value Th1, control device 5 performs control to increase the switching frequency of switching elements 1a and 1b (for example, frequency switching signal H is output to change frequency F to frequency FH). Then, when the control command value becomes less than threshold value Th1 after the control is performed to increase the switching frequency of switching elements 1a and 1b, control device 5 performs control to reduce the increased switching frequency (for example, frequency switching signal L is output to change frequency FH to frequency F).

A configuration in which the carrier frequency (that is, switching frequency) is changed in accordance with the magnitude of a variety of control command values will be described below.

(Output Power Command Value)

The output power command value is a command value of reactive power output from power converter 6 (that is, reactive power command value Prref in FIG. 7), a command value of active power (that is, active power command value Paref in FIG. 8), and a command value of apparent power (hereinafter also referred to as "apparent power command value"). The apparent power command value is a value obtained by dividing active power command value Paref by a predetermined power factor.

In general, it is preferable that power converter 6 is operated at a higher frequency when the output power of power converter 6, such as reactive power, active power, and apparent power, is large. In particular, in a situation in which reactive power command value Prref increases, power converter 6 needs to increase or decrease the output AC voltage. However, when the output AC voltage is increased, there is no margin in modulation ratio due to the output voltage of power converter 6 itself, and when output AC voltage is decreased, there is no margin in modulation ratio due to the system voltage of AC circuit 2. This may make power converter 6 unstable. Furthermore, increasing the reactive power output increases the ripple voltage of capacitor 1e of converter cell 1, which may make power converter 6 unstable. For this, when the output power command value of power converter 6 becomes equal to or greater than a prescribed power command value (for example, threshold value Th1) (that is, when frequency switching signal H is output), control device 5 allows switching elements 1a and 1b in each converter cell 1 to perform switching operation at a high switching frequency (that is, frequency FH), thereby stabilizing the operation of power converter 6.

On the other hand, when the output power command value of power converter 6 is less than a prescribed power command value, presumably, the operation of power converter 6 is stable, and therefore it is not necessary to increase the switching frequency and increase the responsiveness of power converter 6. The power conversion efficiency of power converter 6 is dependent on switching loss of switching elements 1a and 1b in each converter cell 1, and the switching loss increases with a higher switching frequency. For this, when the output command value is less than a prescribed power command value (that is, when frequency switching signal L is output), control device 5 allows switching elements 1a and 1b in each converter cell 1 to perform switching operation at a low switching frequency (that is, frequency F), thereby reducing the switching loss.

(Reactive Current Command Value)

When reactive current command value Irref in FIG. 7 is large, power converter 6 also needs to increase or decrease the output AC voltage, and power converter 6 may become unstable, in the same manner as in the output power command value above. For this, when reactive current command value Irref becomes equal to or greater than a prescribed current command value (for example, threshold value Th1) (that is, when frequency switching signal H is output), control device 5 allows switching elements 1a and 1b in each converter cell 1 to perform switching operation at a high switching frequency, thereby stabilizing the operation of power converter 6. On the other hand, when reactive current command value Irref is less than a prescribed current command value (that is, when frequency switching signal L is output), control device 5 allows switching elements 1a and 1b in each converter cell 1 to perform switching operation at a low switching frequency, thereby reducing the switching loss.

(Modulation Ratio Command Value)

Control device 5 allows switching elements 1a and 1b to perform switching operation under PWM modulation control. The modulation ratio command value in PWM modulation control can be obtained from the amplitude of an arm voltage command value (for example, u-phase positive-side arm voltage command value Vupref) for use in carrier comparison in comparator 67 in FIG. 10 and the amplitude of carrier signal CS. Typically, the modulation ratio command value is a ratio of the peak value of the arm voltage command value to the peak value of carrier signal CS. When the modulation ratio command value increases, there is no margin in DC voltage and the operation of power converter 6 becomes unstable.

For this, when the modulation ratio command value becomes equal to or greater than a prescribed command value (for example, threshold value Th1) (that is, when frequency switching signal H is output), control device 5 allows switching elements 1a and 1b in each converter cell 1 to perform switching operation at a high switching frequency, thereby stabilizing the operation of power converter 6. On the other hand, when the modulation ratio command value is less than a prescribed command value (that is, when frequency switching signal L is output), control device 5 allows switching elements 1a and 1b in each converter cell 1 to perform switching operation at a low switching frequency, thereby reducing the switching loss.

(AC Voltage Command Value, AC Current Command Value)

When the operation of power converter 6 becomes unstable, the AC voltage command value generated by AC control unit 35 in FIG. 6 (for example, u-phase AC voltage command value Vacuref) also becomes unstable. The case of the AC voltage command value will be described below as a representative. The AC current command value generated by an AC current control unit (not shown) included in control device 5 is the same as described below, where the AC voltage command value should read as AC current command value and a prescribed voltage command value should read as prescribed current command value.

Specifically, when the operation of power converter 6 becomes unstable, the AC voltage command value oscillates or diverges, and the AC voltage command value becomes equal to or greater than a prescribed voltage command value (for example, threshold value Th1). For this, when the AC voltage command value becomes equal to or greater than a prescribed voltage command value (that is, when frequency switching signal H is output), control device 5 allows switching elements 1a and 1b in each converter cell 1 to perform switching operation at a high switching frequency, thereby stabilizing the operation of power converter 6. On the other hand, when the AC voltage command value is less than a prescribed voltage command value (that is, when frequency switching signal L is output), control device 5 allows switching elements 1a and 1b in each converter cell 1 to perform switching operation at a low switching frequency, thereby reducing the switching loss. When small periodical oscillation of the AC voltage command value is detected using a bandpass filter or the like, control device 5 may allow switching elements 1a and 1b in each converter cell 1 to perform switching operation at a high switching frequency First Modification In the example in FIG. 11, when the control command value oscillates in the vicinity of threshold value Th1, chattering may occur. Then, in a first modification, a configuration in which a dead zone function is added to determination unit 132 in FIG. 11 will be described.

Figure 12:
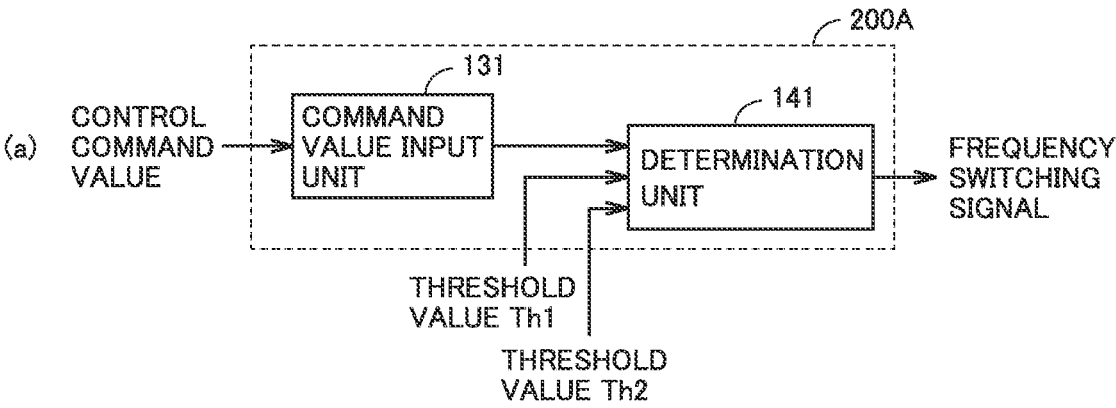
FIG. 12 is a diagram for explaining the operation of a frequency switching unit according to a first modification to the first embodiment.
Figure 12:
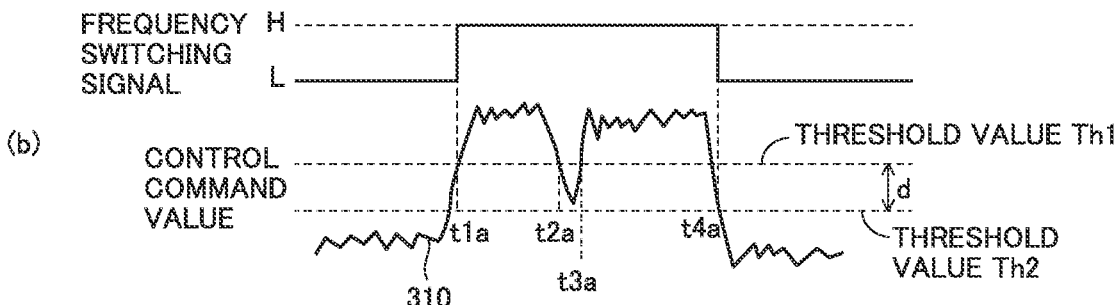

FIG. 12 is a diagram for explaining the operation of a frequency switching unit 200A according to the first modification to the first embodiment. Specifically, FIG. 12(a) is a block diagram for explaining the function of frequency switching unit 200A. FIG. 12(b) is a timing chart for explaining the timing at which a frequency switching signal is output.

Referring to FIG. 12(a), frequency switching unit 200A includes a command value input unit 131 and a determination unit 141. Frequency switching unit 200A corresponds to the one in which determination unit 132 of frequency switching unit 200 is replaced by determination unit 141 with a dead zone function.

Determination unit 141 outputs a frequency switching signal for switching the switching frequency of the switching elements in each converter cell 1, based on a threshold value Th1, a threshold value Th2 (where Th2<Th1), and a control command value. The width d from threshold value Th1 to threshold value Th2 corresponds to a dead zone.

Referring to FIG. 12(b), a waveform 310 is a waveform indicating a control command value. In a period before time t1a, the control command value is less than threshold value Th1. In this period, determination unit 141 outputs frequency switching signal L. In a period from time t1a to time t2a, the control command value is equal to or greater than threshold value Th1. In a period from time t2a to time t3a, the control command value is less than threshold value Th1 and equal to or greater than threshold value Th2. In a period from time t3a to time t4a, the control command value is equal to or greater than threshold value Th1. Here in a period from time t1a to time t4a, determination unit 141 outputs frequency switching signal H. In a period after time t4a, the control command value is less than threshold value Th2. In this period, determination unit 141 outputs frequency switching signal L.

In this way, when the control command value becomes equal to or greater than threshold value Th1 and frequency switching signal H is output, determination unit 141 keeps the output of frequency switching signal H as long as the control command value is equal to or greater than threshold value Th2. The switching frequency of switching elements 1a and 1b therefore does not change. Then, when the control command value becomes less than threshold value Th2, determination unit 141 outputs frequency switching signal L.

Therefore, in the example in FIG. 12, in a period before time t1a, the switching frequency is frequency F, in a period from time t1a to time t4a, the switching frequency is frequency FH, and in a period after time t4a, the switching frequency is frequency F.

In short, when the control command value becomes equal to or greater than threshold value Th1, control device 5 performs control to increase the switching frequency of switching elements 1a and 1b (for example, frequency F is changed to frequency FH). Then, when the control command value becomes less than threshold value Th2 smaller than threshold value Th1 after the control is performed to increase the switching frequency of switching elements 1a and Tb, control device 5 performs control to reduce the increased switching frequency (for example, frequency FH is changed to frequency F).

The configuration in FIG. 12 can prevent occurrence of chattering of the switching frequency, in addition to the advantage of the configuration in FIG. 11.

Second Modification

In a second modification, another configuration for preventing occurrence of chattering will be described.

Figure 13:
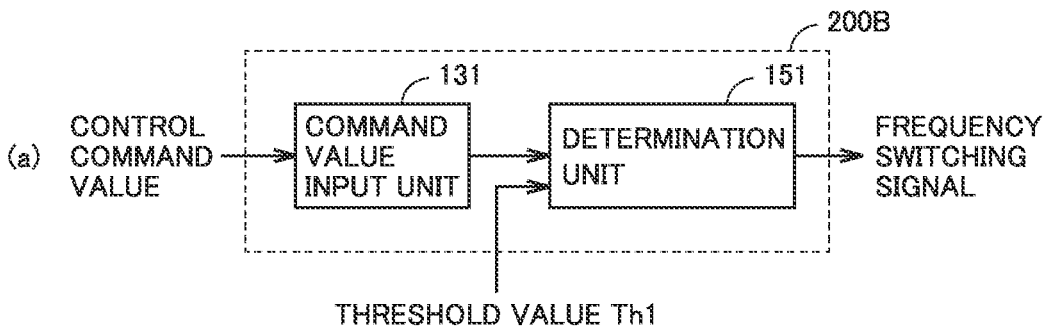
FIG. 13 is a diagram for explaining the operation of a frequency switching unit according to a second modification to the first embodiment.
Figure 13:
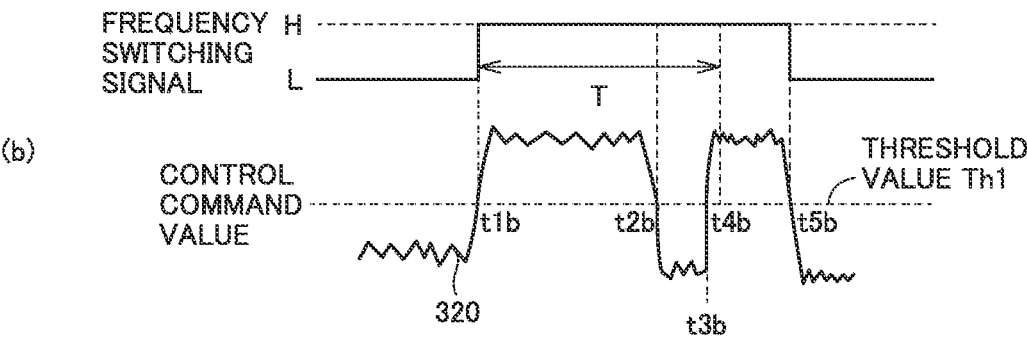
Figure 13:
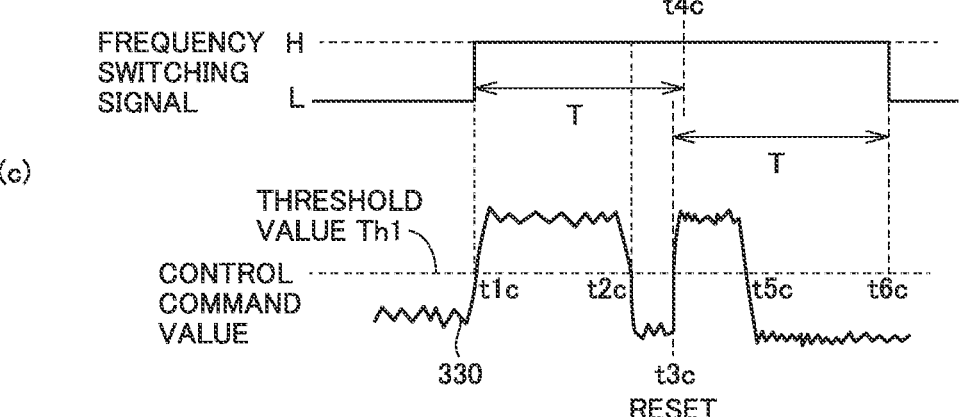

FIG. 13 is a diagram for explaining the operation of a frequency switching unit 200B according to the second modification to the first embodiment. Specifically, FIG. 13(a) is a block diagram for explaining the function of frequency switching unit 200B. FIG. 13(b) is an example of a timing chart for explaining the timing at which a frequency switching signal is output. FIG. 13(c) is another example of a timing chart for explaining the timing at which a frequency switching signal is output.

Referring to FIG. 13(a), frequency switching unit 200B includes a command value input unit 131 and a determination unit 151. Frequency switching unit 200B corresponds to the one in which determination unit 132 of frequency switching unit 200 is replaced by determination unit 151 with a timer function.

Determination unit 151 outputs a frequency switching signal for switching the switching frequency of the switching elements in each converter cell 1, based on a threshold value Th1 and a control command value.

Referring to FIG. 13(b), a waveform 320 is a waveform indicating a control command value. In a period before time t1b, the control command value is less than threshold value Th1. In this period, determination unit 151 outputs frequency switching signal L. In a period from time t1b to time t2b, the control command value is equal to or greater than threshold value Th1.

Determination unit 151 keeps the output of frequency switching signal H in a period until a timer time period T elapses since frequency switching signal H is output (in the example in FIG. 13, the time period from time t1b to time t4b). Therefore, although the control command value is less than threshold value Th1 in a period from time t2b to time t3b, determination unit 151 keeps the output of frequency switching signal H. Then, in a period from time t3b before the elapse of timer time period T to time t5b, the control command value is equal to or greater than threshold value Th1. Therefore, determination unit 151 keeps the output of frequency switching signal H even in a period from time t3b to time t5b. As a result, in a period from time t1b to time t5b, determination unit 151 outputs frequency switching signal H.

Then, when time t5b is reached after timer time period T elapses, the control command value becomes less than threshold value Th1. Therefore, in a period after time t5b, determination unit 151 outputs frequency switching signal L.

In this way, when the control command value becomes equal to or greater than threshold value Th1 and frequency switching signal H is output, determination unit 151 keeps the output of frequency switching signal H until timer time period T elapses, even when the control command value becomes less than threshold value Th1. The switching frequency of switching elements 1a and 1b therefore does not change. Then, when the control command value becomes less than threshold value Th1 after the elapse of timer time period T, determination unit 151 outputs frequency switching signal L.

In the example in FIG. 13(b), in a period before time t1b, the switching frequency is frequency F, in a period from time t1b to time t5b, the switching frequency is frequency FH, and in a period after time t5b, the switching frequency is frequency F.

In short, until timer time period T elapses after the control command value becomes equal to or greater than threshold value Th1, control device 5 performs control to increase the switching frequency of switching elements 1a and 1b (for example, frequency F is changed to frequency FH). When the control command value becomes less than threshold value Th1 after the elapse of timer time period T since threshold value Th1 or greater, control device 5 performs control to reduce the increased switching frequency (for example, frequency FH is changed to frequency F).

Determination unit 151 may be configured such that timer time period T is reset as shown in FIG. 13(*c*). Specifically, referring to FIG. 13(*c*), a waveform 330 is a waveform indicating a control command value. In a period until time t1*c*, the control command value is less than threshold value Th1. In this period, determination unit 151 outputs frequency switching signal L. In a period from time t1*c* to time t2*c*, the control command value is equal to or greater than threshold value Th1.

Determination unit 151 keeps the output of frequency switching signal H in a period until timer time period T elapses since frequency switching signal H is output (in the example in FIG. 13(*c*), the time period from time t1*c* to time t4*c*). Therefore, although the control command value is less than threshold value Th1 in a period from time t2*c* to time t3*c*, determination unit 151 keeps the output of frequency switching signal H.

Then, at time t3*c* before time t4*c* when timer time period T elapses, the control command value is equal to or greater than threshold value Th1. That is, the control command value becomes less than threshold value Th1 at time t2*c* and thereafter becomes equal to or greater than threshold value Th1 again at time t3*c*. Therefore, previous timer time period T is reset, and determination unit 151 keeps the output of frequency switching signal H in a period from time t3*c* to the elapse of timer time period T (in the example in FIG. 13(*c*), a period from time t3*c* to time t6*c*). In this way, although the control command value is less than threshold value Th1 after time t5*c*, determination unit 151 keeps the output of frequency switching signal H in a period from time t5*c* to time t6*c*. Then, at time t6*c* when timer time period T elapses, the control command value is less than threshold value Th1 and therefore determination unit 151 outputs frequency switching signal L.

In the example in FIG. 13(*c*), in a period before time t1*c*, the switching frequency is frequency F, in a period from time t1*c* to time t6*c*, the switching frequency is frequency FH, and in a period after time t6*c*, the switching frequency is frequency F.

In short, until timer time period T elapses after the control command value becomes equal to or greater than threshold value Th1, control device 5 performs control to increase the switching frequency of switching elements 1*a* and 1*b* (for example, frequency F is changed to frequency FH). When the control command value is less than threshold value Th1 when timer time period T elapses since the control command value becomes equal to or greater than threshold value Th1 (for example, when time t6*c* is reached), control device 5 performs control to reduce the increased switching frequency of the switching elements (for example, frequency FH is changed to frequency F).

The configuration in FIG. 13 can prevent occurrence of chattering of the switching frequency, in addition to the advantage of the configuration in FIG. 11.

Second Embodiment

The foregoing first embodiment focuses on a variety of control command values to increase the switching frequency. In a second embodiment, a configuration in which the switching frequency of the switching elements in each converter cell 1 is switched using a variety of parameters measured or computed in power conversion device 100 will be described.

(Overview)

Figure 14:
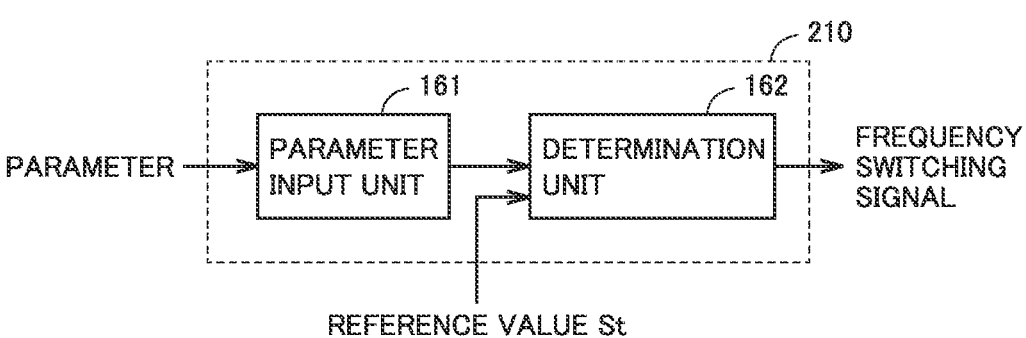
FIG. 14 is a diagram for explaining the operation of a frequency switching unit according to a second embodiment.

FIG. 14 is a diagram for explaining the function of a frequency switching unit 210 according to the second embodiment. Referring to FIG. 14, frequency switching unit 210 includes a parameter input unit 161 and a determination unit 162. Parameter input unit 161 accepts an input of a variety of parameters concerning voltage or current and outputs the accepted parameter to determination unit 162. The parameters are, for example, a high frequency component, negative sequence current, zero sequence current, the unbalance ratio of system voltage, circulating current, and a capacitor voltage mean value. The high frequency component, the negative sequence current, the zero sequence current, and the unbalance ratio of system voltage are parameters calculated based on the quantity of electricity of AC circuit 2. The circulating current and the capacitor voltage are parameters calculated based on the measured value in power converter 6.

Determination unit 162 outputs a frequency switching signal for switching the switching frequency of the switching elements in each converter cell 1, based on a reference value St and a parameter. Specifically, when the magnitude of parameter is equal to or greater than reference value St, determination unit 162 outputs frequency switching signal H to carrier generator 65, and when the magnitude of parameter is less than reference value St, determination unit 162 outputs frequency switching signal L to carrier generator 65. Reference value St is a generic term of a prescribed reference value set for each of a variety of parameters. The function of determination unit 162 is basically similar to the function of determination unit 132. The foregoing first modification and second modification may be employed in determination unit 162.

Carrier generator 65 sets the carrier frequency to frequency F when an input of frequency switching signal L is being accepted, and sets the carrier frequency to frequency FH when an input of frequency switching signal H is being accepted.

In short, when the magnitude of parameter becomes equal to or greater than reference value St, control device 5 performs control to increase the switching frequency of switching elements 1*a* and 1*b* (for example, frequency switching signal H is output to change frequency F to frequency FH). Then, when the magnitude of parameter becomes less than reference value St after the control is performed to increase the switching frequency of switching elements 1*a* and Tb, control device 5 performs control to reduce the increased switching frequency (for example, frequency switching signal L is output to change frequency FH to frequency F).

A configuration in which the carrier frequency (that is, switching frequency) is changed in accordance with the magnitude of a variety of parameters will be described below.

(Harmonic Component)

Control device 5 has a function of detecting a harmonic component included in AC voltage or AC current (for example, harmonic detection unit). The harmonic detection unit receives an input of AC voltage (for example, AC voltage measured values Vacu, Vacv, Vacw) detected by AC voltage detector 10 and calculates a fundamental component for the frequency of the AC voltage and a harmonic component of a predetermined order (for example, third order). For example, fast Fourier transform and discrete Fourier transform are known as calculation methods of the fundamental component of AC voltage and the harmonic voltage. The harmonic detection unit may calculate the harmonic component of the AC current measured value detected by AC current detector 15. The harmonic detection unit outputs the calculated harmonic component to parameter input unit 161.

Parameter input unit 161 accepts an input of the harmonic component of AC voltage or AC current of AC circuit 2 as a parameter and outputs the accepted harmonic component to determination unit 162. When the magnitude (for example, amplitude) of the harmonic component is equal to or greater than a prescribed reference value (for example, reference value St), determination unit 162 outputs frequency switching signal H. Thus, when the harmonic component becomes equal to or greater than a prescribed reference value, control device 5 allows switching elements 1*a* and Tb to perform switching operation at a high switching frequency to reduce the harmonic component, thereby stabilizing the operation of power converter 6.

On the other hand, when the magnitude of the harmonic component is less than a prescribed reference value, determination unit 162 outputs frequency switching signal L. Thus, when the harmonic component becomes less than a prescribed reference value, control device 5 allows switching elements 1*a* and 1*b* to perform switching operation at a low switching frequency, thereby reducing the switching loss.

(Negative Sequence Current)

Control device 5 has a function of calculating negative sequence current flowing between AC circuit 2 and power converter 6 (for example, negative sequence current calculation unit). The negative sequence current calculation unit calculates negative sequence current flowing between AC circuit 2 and power converter 6, based on the AC current measured value of each phase detected by AC current detector 15. The negative sequence current calculation unit outputs the calculated negative sequence current to parameter input unit 161. Parameter input unit 161 accepts an input of negative sequence current as a parameter and outputs the accepted negative sequence current to determination unit 162.

When AC voltage of AC circuit 2 becomes unbalanced, negative sequence current occurs in AC current. The negative sequence current causes ripples in the capacitor voltage of converter cell 1 to make the operation of power converter 6 unstable. Then, when the magnitude (for example, amplitude) of the negative sequence current is equal to or greater than a prescribed reference value (for example, reference value St), determination unit 162 outputs frequency switching signal H. Thus, when the negative sequence current equal to or greater than a prescribed reference value is detected, control device 5 allows switching elements 1*a* and 1*b* to perform switching operation at a high switching frequency, thereby stabilizing the operation of power converter 6.

On the other hand, when the magnitude of the negative sequence current is less than a prescribed reference value, determination unit 162 outputs frequency switching signal L. Thus, when the negative sequence current becomes less than a prescribed reference value, control device 5 allows switching elements 1*a* and 1*b* to perform switching operation at a low switching frequency, thereby reducing the switching loss.

(Zero Sequence Current)

Transformer 3 in FIG. 1 is provided between AC circuit 2 and power converter 6. Specifically, AC circuit 2 is connected to the primary side of transformer 3, and power converter 6 is connected to the secondary side of transformer 3. For example, transformer 3 is a Y-Y connection three-phase transformer. Transformer 3 has a primary winding in Y connection and the neutral point of the secondary winding is grounded. When a fault occurs in AC circuit 2, zero sequence current flows through the neutral point of the secondary side of transformer 3. Control device 5 has a function of calculating this zero sequence current (for example, zero sequence current calculation unit). The zero sequence current calculation unit calculates zero sequence current flowing through the neutral point, based on the AC current measured value of each phase detected by AC current detector 15. The zero sequence current calculation unit outputs the calculated zero sequence current to parameter input unit 161. Parameter input unit 161 accepts an input of zero sequence current flowing through the neutral point as a parameter and outputs the accepted zero sequence current to determination unit 162. When a zero sequence current detector is provided between the neutral point and the ground, parameter input unit 161 may accept an input of zero sequence current detected by the zero sequence current detector.

When the magnitude (for example, amplitude) of the zero sequence current is equal to or greater than a prescribed reference value (for example, reference value St), determination unit 162 outputs frequency switching signal H. Thus, when the zero sequence current equal to or greater than a prescribed reference value is detected, control device 5 assumes that a fault has occurred in AC circuit 2 and allows switching elements 1*a* and 1*b* to perform switching operation at a high switching frequency, thereby stabilizing the operation of power converter 6.

On the other hand, when the magnitude of the zero sequence current is less than a prescribed reference value, determination unit 162 outputs frequency switching signal L. Thus, when the zero sequence current becomes less than a prescribed reference value, control device 5 allows switching elements 1*a* and 1*b* to perform switching operation at a low switching frequency, thereby reducing the switching loss.

(Unbalance Ratio of System Voltage)

Control device 5 has a function of calculating the unbalance ratio of a system voltage (that is, AC voltage of AC circuit 2) based on a positive sequence component and a negative sequence component of the system voltage (for example, unbalance ratio calculation unit). The unbalance ratio calculation unit accepts an input of AC voltage (for example, AC voltage measured values Vacu, Vacv, and Vacw) detected by AC voltage detector 10 and calculates a positive sequence voltage and a negative sequence voltage based on the AC voltage measured values Vacu, Vacv, and Vacw. The unbalance ratio calculation unit calculates the unbalance ratio that is a ratio of the negative sequence voltage to the positive sequence voltage. The unbalance ratio calculation unit outputs the calculated unbalance ratio to parameter input unit 161. Parameter input unit 161 accepts an input of the unbalance ratio of the system voltage as a parameter and outputs the accepted unbalance ratio to determination unit 162.

When the AC voltage of AC circuit 2 becomes unbalanced, ripples occur in the capacitor voltage of converter cell 1 to make the operation of power converter 6 unstable. Then, when the magnitude of the unbalance ratio is equal to or greater than a prescribed reference value (for example, reference value St), determination unit 162 outputs frequency switching signal H. Thus, when the unbalance ratio of the system voltage becomes equal to or greater than a prescribed reference value, control device 5 allows switching elements 1a and 1b to perform switching operation at a high switching frequency, thereby stabilizing the operation of power converter 6.

On the other hand, when the unbalance ratio is less than a prescribed reference value, determination unit 162 outputs frequency switching signal L. Thus, when the unbalance ratio becomes less than a prescribed reference value, control device 5 allows switching elements 1a and 1b to perform switching operation at a low switching frequency, thereby reducing the switching loss.

(Circulating Current)

As described in FIG. 9, a circulating current command value is generated by feedback control by interphase balance controller 43 and positive/negative balance controller 44. In this way, when the capacitor voltages vary among converter cells 1 in the MMC conversion-type power converter, balance control of the capacitor voltages is performed using circulating current. Instability of the capacitor voltage control therefore can be detected based on the magnitude of circulating current.

Specifically, parameter input unit 161 accepts an input of circulating current computed by current computing unit 21 as a parameter and outputs the accepted circulating current to determination unit 162. When the magnitude (for example, amplitude) of the circulating current is equal to or greater than a prescribed reference value (for example, reference value St), determination unit 162 outputs frequency switching signal H. Thus, when the magnitude of circulating current becomes equal to or greater than a prescribed reference value, control device 5 assumes that the capacitor voltage control is unstable and allows switching elements 1a and 1b to perform switching operation at a high switching frequency, thereby stabilizing the operation of power converter 6.

On the other hand, when the magnitude of the circulating current is less than a prescribed reference value, determination unit 162 outputs frequency switching signal L. Thus, when the magnitude of the circulating current becomes less than a prescribed reference value, control device 5 allows switching elements 1a and 1b to perform switching operation at a low switching frequency, thereby reducing the switching loss.

(Capacitor Voltage)

Parameter input unit 161 accepts an input of capacitor voltage mean value Vciav computed by mean value computing unit 22 as a parameter and outputs the accepted capacitor voltage mean value Vciav to determination unit 162. When the variation range of capacitor voltage mean value Vciav is equal to or greater than a reference variation range, determination unit 162 outputs frequency switching signal H. On the other hand, when the variation range of capacitor voltage mean value Vciav is less than a reference variation range, determination unit 162 outputs frequency switching signal L.

In another aspect, parameter input unit 161 may accept an input of individual capacitor voltage measured value Vci detected in each converter cell 1 as a parameter and output the accepted individual capacitor voltage measured value Vci to determination unit 162. When the maximum value of capacitor voltage measured values Vci is greater than the upper limit of a threshold range or when the minimum value of capacitor voltage measured values Vci is smaller than the lower limit of a threshold range (that is, at least one of capacitor voltage measured values Vci falls out of a threshold range), determination unit 162 outputs frequency switching signal H. On the other hand, when the maximum value of capacitor voltage measured values Vci is equal to or less than the upper limit and when the minimum value of capacitor voltage measured values Vci is equal to or greater than the lower limit (that is, all of capacitor voltage measured values Vci fall within a threshold range), determination unit 162 outputs frequency switching signal L.

In short, when the variation range of the voltage mean value of the capacitors is equal to or greater than a reference variation range or when at least one of the capacitor voltages falls out of a threshold range, control device 5 performs control to increase the switching frequency of switching elements 1a and 1b (for example, frequency F is changed to frequency FH). The operation of power converter 6 is thus stabilized. Then, when the variation range of the voltage mean value of the capacitors is less than a reference variation range and when all of the capacitor voltages are within a threshold range after the control is performed to increase the switching frequency of switching elements 1a and 1b, control device 5 performs control to reduce the increased switching frequency (for example, frequency FH is changed to frequency F). The switching loss is thus reduced.

Third Embodiment

In a third embodiment, a configuration in which the switching frequency of the switching elements in each converter cell 1 is switched using information from the outside of power conversion device 100 will be described.

(Overview)

Figure 15:
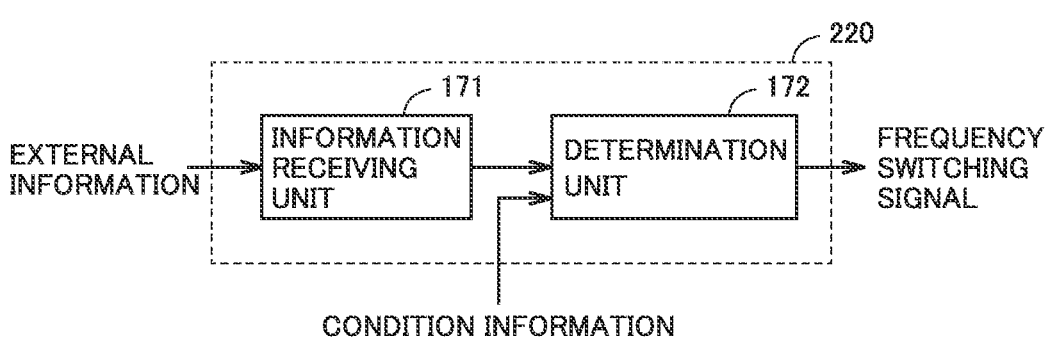
FIG. 15 is a diagram for explaining the operation of a frequency switching unit according to a third embodiment.

FIG. 15 is a diagram for explaining the function of a frequency switching unit 220 according to the third embodiment. Referring to FIG. 15, frequency switching unit 220 includes an information receiving unit 171 and a determination unit 172. Information receiving unit 171 receives a variety of external information from an external device (for example, a higher-level device of power conversion device 100) and outputs the received external information to determination unit 172. For example, the external information is state information indicating a system state of AC circuit 2 and instruction information for specifying an operation mode of power converter 6.

Determination unit 172 outputs a frequency switching signal for switching the switching frequency of the switching elements in each converter cell 1, based external information and a predetermined condition. Determination unit 172 outputs frequency switching signal H to carrier generator 65 when the external information satisfies a predetermined condition, and outputs frequency switching signal L to carrier generator 65 when the external information does not satisfy a predetermined condition.

Carrier generator 65 sets the carrier frequency to frequency F when an input of frequency switching signal L is being accepted, and sets the carrier frequency to frequency FH when an input of frequency switching signal H is being accepted.

A configuration in which the carrier frequency (that is, switching frequency) is changed in accordance with a variety of external information will be described below.

(System State)

Information receiving unit 171 receives state information indicating a system state of AC circuit 2. The state information is, for example, a short circuit capacity, active power, the number of lines, the open/close state of a circuit breaker provided in AC circuit 2, and an operating state (for example, information indicating start or stop) of system equipment (for example, harmonic filter, phase advance capacitor, static var compensator (SVC), static synchronous compensator (STATCOM), another DC transmission device)

provided in AC circuit 2. Information receiving unit 171 outputs the state information to determination unit 172.

Determination unit 172 determines whether a condition that the system state of AC circuit 2 based on the state information is a prescribed state is satisfied, and when the condition is satisfied, outputs frequency switching signal H. On the other hand, when the condition is not satisfied, determination unit 172 outputs frequency switching signal L.

In an example, when a condition that the short circuit capacity of AC circuit 2 is less than a reference capacity is satisfied, determination unit 172 outputs frequency switching signal H. In another example, when a condition that active power flowing through AC circuit 2 is equal to or greater than a reference power is satisfied, determination unit 172 outputs frequency switching signal H. In another example, when a condition that the number of lines of AC circuit 2 is equal to or less than a reference number of lines (for example, one line) is satisfied, determination unit 172 outputs frequency switching signal H.

In another example, a circuit breaker information table is referred to, and when a condition that a prescribed circuit breaker provided in AC circuit 2 is opened is satisfied, determination unit 172 outputs frequency switching signal H. The circuit breaker information table includes information indicating that frequency switching signal H should be output when which of the circuit breakers provided in AC circuit 2 is opened.

In another example, a system equipment information table is referred to, and when a condition that prescribed system equipment provided in AC circuit 2 is stopped is satisfied, determination unit 172 outputs frequency switching signal H. The system equipment information table includes information indicating that frequency switching signal H should be output when which of the system equipment provided in AC circuit 2 is stopped.

Thus, when a condition that the system state of AC circuit 2 is a prescribed state is satisfied, control device 5 performs control to increase the switching frequency of switching elements 1a and 1b (for example, frequency F is changed to frequency FH). The operation of power converter 6 is thus stabilized. On the other hand, when a condition that the system state of AC circuit 2 is a prescribed state is not satisfied after the control is performed to increase the switching frequency of switching elements 1a and 1b, control device 5 performs control to reduce the increased switching frequency (for example, frequency FH is changed to frequency F). The switching loss is thus reduced.
(Operation Mode)

Information receiving unit 171 receives instruction information on an operation mode of power converter 6. Information receiving unit 171 outputs the instruction information to determination unit 172.

Determination unit 172 determines whether a condition that the operation mode according to the instruction information is a prescribed mode is satisfied, and when the condition is satisfied, outputs frequency switching signal H. On the other hand, when the condition is not satisfied, determination unit 172 outputs frequency switching signal L.

The prescribed mode is any one of a starting mode, a black start mode, a passive system mode, a derating mode, and a power flow reversal mode. The starting mode is a mode for starting power converter 6. The black start mode is a mode of restoring AC circuit 2 from a blackout state by power converter 6 itself without receiving power from another power source. The passive system mode is a mode of operating power converter 6 in a state in which no power source is connected to AC circuit 2 and only a load is connected. The derating mode is a mode of operating power converter 6 at a rated value (for example, a rated output power) or lower. The power flow reversal mode is a mode of reversing reverse converter operation and forward converter operation in power converter 6.

When instruction information from an external device is received and change to the prescribed mode is specified, control device 5 performs control to increase the switching frequency of switching elements 1a and 1b (for example, frequency F is changed to frequency FH). The operation of power converter 6 is thus stabilized. When change to the prescribed mode is not specified, control device 5 allows switching elements 1a and 1b to perform switching operation at a low switching frequency, thereby reducing the switching loss.

When instruction information for specifying recovery to normal operation (for example, change to normal mode) is received after the control is performed to increase the switching frequency of switching elements 1a and 1b, control device 5 performs control to reduce the increased switching frequency (for example, frequency FH is changed to frequency F). In this way, control device 5 can set an appropriate switching frequency in accordance with an operation mode of power converter 6.
(Others)

In another aspect, control device 5 may receive at least one of state information indicating a system state of AC circuit 2 and instruction information for specifying an operation mode of power converter 6. In this case, when at least one of a condition that a system state based on state information is a prescribed state and a condition that an operation mode according to instruction information is a prescribed mode is satisfied, control device 5 performs control to increase the switching frequency of switching elements 1a and 1b.

Other Embodiments (1) In the forgoing embodiments, carrier generator 65 sets the carrier frequency (that is, switching frequency) to frequency F when an input of frequency switching signal L is being accepted from control device 5, and sets the switching frequency to frequency FH when an input of frequency switching signal H is being accepted from control device 5. However, the present description is not limited to this configuration. For example, carrier generator 65 may increase the switching frequency stepwise in accordance with frequency switching signal H from control device 5.

The case of the first embodiment will be described. When a control command value is equal to or greater than threshold value Th1, frequency switching unit 200 outputs frequency switching signal H and also outputs a difference Dx1 between the control command value and threshold value Th1. Difference Dx1 is an indicator that indicates how much the control command value is greater than threshold value Th1. Carrier generator 65 therefore sets a higher frequency as difference Dx1 increases. For example, it is assumed that three levels of frequencies FH1, FH2, and FH3 (where FH3>FH2>FH1) higher than frequency F are prepared, and threshold values Y1, Y2, and Y3 (where Y3>Y2>Y1) for difference Dx1 are prepared.

For example, when difference Dx1 is equal to or greater than threshold value Y3, carrier generator 65 sets the carrier frequency to the highest frequency FH3. When difference Dx1 is less than threshold value Y3 and equal to or greater than threshold value Y2, carrier generator 65 sets the carrier frequency to the next higher frequency FH2. When difference Dx1 is less than threshold value Y1, carrier generator 65 sets the carrier frequency to the lowest frequency FH1. In this way, control device 5 may increase the switching frequency of switching elements 1a and 1b, based on frequency switching signal H and difference Dx1.

The case of the second embodiment is basically similar to that of the first embodiment. When the magnitude of parameter is equal to or greater than reference value St, frequency switching unit 210 outputs frequency switching signal H and also outputs a difference Dx2 between the magnitude of parameter and reference value St. Difference Dx2 is an indicator that indicates how much the magnitude of parameter is greater than reference value St. Carrier generator 65 sets a higher frequency as difference Dx2 increases, in the same manner as in the first embodiment. In this way, control device 5 may increase the switching frequency of switching elements 1a and 1b, based on frequency switching signal H and difference Dx2.

The case of the third embodiment will be described. In this case, a table indicating condition information associated with frequencies FH1, FH2, and FH3 is prepared. When a condition that a system state of AC circuit 2 is a prescribed state is satisfied, frequency switching unit 220 outputs frequency switching signal H and also outputs condition information indicating the satisfied condition.

Carrier generator 65 refers to the table to select the frequency associated with the accepted condition information and sets the selected frequency. For example, it is assumed that condition information indicating a condition that the short circuit capacity is less than a reference capacity is output. It is also assumed that this condition information is associated with frequency FH2. In this case, carrier generator 65 sets the carrier frequency to frequency FH2.

When a condition that an operation mode of power converter 6 is a prescribed mode is satisfied, frequency switching unit 220 outputs frequency switching signal H and also outputs condition information indicating the satisfied condition. Similarly, carrier generator 65 refers to the table to select the frequency associated with the accepted condition information and sets the selected frequency. For example, it is assumed that condition information indicating a condition that the operation mode is the black start mode is output and this condition information is associated with frequency FH3. In this case, carrier generator 65 sets the carrier frequency to frequency FH3.

As described above, control device 5 may increase the switching frequency of switching elements 1a and 1b stepwise. With this configuration, an appropriate switching frequency can be set in consideration of the operation stability and the power conversion efficiency of power converter 6.

(2) The configuration in which the switching frequency is increased stepwise has been described in (1) above. Here, in the first embodiment, the configuration in which the switching frequency is switched in accordance with the AC voltage command value or the AC current command value has been described, and in the second embodiment, the configuration in which the switching frequency is switched in accordance with the harmonic component and the capacitor voltage has been described. In these configurations, the switching frequency may be increased continuously. For example, when a condition that the AC voltage command value is equal to or greater than a prescribed threshold (for example, threshold value Th1) is satisfied, frequency switching unit 200 outputs frequency switching signal H and also outputs condition information indicating the satisfied condition. When frequency switching signal H and the condition information are received from control device 5, carrier generator 65 increases the switching frequency continuously. This is applicable to the harmonic component and the capacitor voltage.

(3) In the foregoing first embodiment, the configuration in which the switching frequency is increased from frequency F to frequency FH in accordance with an output of frequency switching signal H and thereafter returned from frequency FH to frequency F in accordance with an output of frequency switching signal L has been described. However, the present description is not limited to this configuration. For example, as long as the frequency is reduced from frequency FH in accordance with an output of frequency switching signal L, the frequency may not necessarily be returned to exactly the same frequency F.

(4) In the foregoing embodiments, the configuration in which the switching frequency is changed using at least one of control command values, parameters, and external information has been described. However, the present description is not limited to this configuration. Here, the control command values, the parameters, and the external information are collectively referred to as indicator information. In this case, a plurality of frequency switching units each corresponding to one of plural pieces of indicator information may be provided, and the final frequency switching signal may be output based on a combination of the respective outputs of the frequency switching units. For example, the final frequency switching signal H may be input to carrier generator 65 when a frequency switching unit corresponding to at least one of plural pieces of indicator information outputs frequency switching signal H. Alternatively, the final frequency switching signal H may be input to carrier generator 65 when a frequency switching unit corresponding to first indicator information (for example, output power command value) among plural pieces of indicator information outputs frequency switching signal H, and a frequency switching unit corresponding to second indicator information (for example, negative sequence current) outputs frequency switching signal H.

(5) The configurations exemplified as the embodiments are examples of the configurations of the present disclosure and may be combined with other known techniques or may be modified, for example, partially omitted, without departing from the spirit of the present disclosure. In the foregoing embodiments, the processing and configuration described in another embodiment may be employed as appropriate and carried out.

Embodiments disclosed here should be understood as being illustrative rather than being limitative in all respects. The scope of the present disclosure is shown not in the foregoing description but in the claims, and it is intended that all modifications that come within the meaning and range of equivalence to the claims are embraced here.

REFERENCE SIGNS LIST

1 converter cell, 1a, 1b, 1f, 1g switching element, 1c, 1d, 1h, 1i diode, 1e capacitor, 1n, 1p input/output terminal, 2 AC circuit, 3 transformer, 4 DC circuit, 5 control device, 6 power converter, 7a, 7b reactor, 8u, 8v, 8w leg circuit, 9a, 9b arm current detector, 10 AC voltage detector, 11a, 11b DC voltage detector, 13u, 13v, 13w positive-side arm, 14u, 14v, 14w negative-side arm, 15 AC current detector, 20 arm common controller, 21 current computing unit, 22 mean value computing unit, 23, 82 computing unit, 25 reactive power controller, 27 reactive current controller, 29 DC capacitor voltage controller, 31 active current controller, 32 two phase/three phase converter, 35 AC control unit, 36 DC control unit, 40*u*, 40*v*, 40*w* arm controller, 41 positive-side command generator, 42 negative-side command generator, 43 interphase balance controller, 44 positive/negative balance controller, 51 circulating current controller, 52, 62 communication device, 60F, 60H, 60Hyb cell main circuit, 61 cell individual controller, 64 capacitor voltage controller, 65 carrier generator, 67 comparator, 70 input converter, 71 sample and hold circuit, 72 multiplexer, 73 A/D converter, 74 CPU, 75 RAM, 76 ROM, 77 input/output interface, 78 auxiliary storage device, 79 bus, 81 DC controller, 84 active power controller, 86 DC current controller, 100 power conversion device, 131 command value input unit, 132,141,151,162,172 determination unit, 161 parameter input unit, 171 information receiving unit, 200, 200A, 200B, 210, 220 frequency switching unit.

The invention claimed is:

1. A power conversion device comprising:
a self-commutated power converter to perform power conversion between an AC power system and a DC circuit; and
a control device to control switching operation of a switching element included in the self-commutated power converter,
wherein the control device performs first control to increase a switching frequency of the switching element when a control command value for the self-commutated power converter, corresponding to a quantity of electricity of the AC power system or a calculated value based on the quantity of electricity, becomes equal to or greater than a first threshold value,
wherein the control command value corresponding to the quantity of electricity of the AC power system is an AC voltage command value corresponding to an AC voltage of the AC power system or an AC current command value corresponding to an AC current of the AC power system,
wherein the control command value corresponding to the calculated value is an active power command value corresponding to an active power calculated based on the AC voltage and the AC current, a reactive power command value corresponding to a reactive power calculated based on the AC voltage and the AC current, an apparent power command value corresponding to an apparent power calculated based on the AC voltage and the AC current, or a reactive current command value corresponding to a reactive current calculated based on the AC voltage and the AC current.

2. The power conversion device according to claim 1, wherein when the control command value becomes less than the first threshold value after the first control is performed, the control device performs second control to reduce the increased switching frequency of the switching element.

3. The power conversion device according to claim 1, wherein when the control command value becomes less than a second threshold value smaller than the first threshold value after the first control is performed, the control device performs second control to reduce the increased switching frequency of the switching element.

4. The power conversion device according claim 1, wherein the control device performs the first control until a first time period elapses since the control command value becomes equal to or greater than the first threshold value.

5. The power conversion device according to claim 1, wherein
the control device
performs the first control until a first time period elapses since the control command value becomes equal to or greater than the first threshold value, and
performs second control to reduce the switching frequency of the switching element that is increased in accordance with the first control, when the control command value is less than the first threshold value when the first time period elapses since the control command value becomes equal to or greater than the first threshold value.

6. The power conversion device according to claim 1, wherein the first control includes increasing a switching frequency of the switching element, based on a difference between the control command value and the first threshold value.

7. A power conversion device comprising:
a self-commutated power converter to perform power conversion between an AC circuit and a DC circuit; and
a control device to control switching operation of a switching element included in the self-commutated power converter,
the self-commutated power converter including a plurality of leg circuits,
the leg circuits each including a plurality of converter cells cascaded to each other, the converter cells each including a capacitor and the switching element,
wherein the control device performs control to increase a switching frequency of the switching element when circulating current circulating between the leg circuits is equal to or greater than a reference value, or when a variation range of a voltage mean value of the capacitors is equal to or greater than a reference variation range.

8. A power conversion device comprising:
a self-commutated power converter to perform power conversion between an AC circuit and a DC circuit; and
a control device to control switching operation of a switching element included in the self-commutated power converter, wherein
the control device
receives at least one of an operating state of system equipment provided in the AC circuit and instruction information for specifying an operation mode of the self-commutated power converter, and
performs control to increase a switching frequency of the switching element when at least one of a first condition that the system equipment is in a stopped state and a second condition that the operation mode according to the instruction information is a prescribed mode is satisfied.

9. The power conversion device according to claim 8, wherein the prescribed mode includes at least one of: a starting mode for starting the self-commutated power converter; a black start mode of restoring the AC circuit from a blackout state without receiving power from another power source; a passive system mode of operating the self-commutated power converter in a state in which no power source is connected to the AC circuit and only a load is connected; a derating mode of operating the self-commutated power converter at a rated value or lower; and a power flow reversal mode of reversing reverse converter operation and forward converter operation in the self-commutated power converter.

10. The power conversion device according to claim 1, wherein when the control command value becomes less than the first threshold value after the first control is performed, the control device performs second control to reduce the increased switching frequency of the switching element.

* * * * *